(12) United States Patent
Yokoo et al.

(10) Patent No.: US 8,590,517 B2
(45) Date of Patent: Nov. 26, 2013

(54) DIESEL ENGINE FOR VEHICLE

(75) Inventors: Takeshi Yokoo, Hiroshima (JP);
Daisuke Shimo, Hiroshima (JP); Yoshie Kakuda, Hiroshima (JP); Kim Sangkyu, Higashihiroshima (JP); Kyotaro Nishimoto, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 379 days.

(21) Appl. No.: 13/160,827

(22) Filed: Jun. 15, 2011

(65) Prior Publication Data

US 2011/0315128 A1    Dec. 29, 2011

(30) Foreign Application Priority Data

Jun. 29, 2010   (JP) .................................. 2010-147529

(51) Int. Cl.
*F02B 47/08*   (2006.01)
*F02M 25/07*   (2006.01)

(52) U.S. Cl.
USPC .................................................. 123/568.14

(58) Field of Classification Search
USPC ........................................ 123/568.11, 568.14
See application file for complete search history.

(56) References Cited

U.S. PATENT DOCUMENTS

| | | | |
|---|---|---|---|
| 6,827,067 B1 * | 12/2004 | Yang et al. | 123/568.14 |
| 8,468,800 B2 * | 6/2013 | Hatamura | 60/278 |
| 2003/0200954 A1 * | 10/2003 | Zsoldos et al. | 123/321 |
| 2005/0081836 A1 * | 4/2005 | Winsor | 123/568.14 |
| 2009/0025697 A1 * | 1/2009 | Hatamura | 123/568.11 |
| 2010/0116255 A1 * | 5/2010 | Hatamura | 123/564 |

FOREIGN PATENT DOCUMENTS

JP        2008-261236 A      10/2008

* cited by examiner

*Primary Examiner* — Erick Solis
(74) *Attorney, Agent, or Firm* — Alleman Hall McCoy Russell & Tuttle LLP

(57) ABSTRACT

A diesel engine body is provided with a geometric compression ratio $\epsilon$ within a range of 12:1 to 15:1. The engine body has an intake valve for opening and closing an intake passage of a cylinder, an exhaust valve for opening and closing an exhaust passage of the cylinder, and an exhaust gas re-circulation passage communicating with the intake and exhaust passages and for partially re-circulating exhaust to the intake passage. During low engine load and rotation speed conditions, the exhaust valve is opened during an intake stroke, and the intake passage is choked. The exhaust valve is closed before the intake valve in the later stage of the intake stroke. An opening area $S_E$ of the exhaust valve is set so that a ratio of $S_E$ to an opening area $S_I$ of the intake valve meets a relation of:

$$0.01\times(15-\epsilon)+0.02 \leq S_E/S_I \leq 0.17.$$

14 Claims, 9 Drawing Sheets

DIESEL ENGINE FOR VEHICLE

BACKGROUND

The present invention relates to a diesel engine for a vehicle, and particularly relates to a diesel engine with a comparatively low compression ratio in which its geometric compression ratio is set within a range of 12:1 to 15:1.

In diesel engines that perform combustions by fuel, in which a main component is diesel fuel being compressed to cause a self-ignition, a comparatively low compression ratio in which a geometric compression ratio is, for example, 15:1 or lower is set in order to perform, for example, a reduction of a discharge amount of NOx. That is, the low compression ratio subsides the combustion rate in the cylinders and suppresses generation of NOx (see JP2008-261236A). Because the lowered compression ratio of the engine reduces mechanical resistance, it is also effective in improving a thermal efficiency.

However, when the geometric compression ratio of the diesel engine is set low, a temperature of the engine at the end of a compression stroke is decreased corresponding to the low compression ratio. Therefore, self-ignition conditions become difficult to be met within, for example, an operation range where the engine has a low load and a low rotation speed. Further, particularly in the diesel engine disclosed in JP2008-261236A, an ignition performance degrades as a cetane number becomes lower depending on the property of fuel to be supplied. Therefore, when factors relating to the operating conditions of the engine and the property of the fuel are combined, the self-ignition conditions further become difficult to be met. Thus, surely securing an ignitability of fuel is important in setting the low compression ratio for the diesel engine regardless of the operating conditions of the engine and the property of the fuel to be supplied.

SUMMARY

The present invention is made in view of the above situations and surely secures a fuel ignitability in a diesel engine for a vehicle, particularly with a low compression ratio.

The diesel engine of the invention, with a comparatively low compression ratio in which a geometric compression ratio is set within a range of 12:1 to 15:1, is configured in that internal EGR gas is introduced into cylinders by opening (re-opening) exhaust valves during an intake stroke, particularly within an operation range where the engine is in low load and low rotation speed so that temperatures of the cylinders at the end of a compression stroke are increased. Further, with the above configuration of the diesel engine, in view of the minimum increase in the temperatures required within the cylinders at the end of the compression stroke so as to satisfy self-ignition conditions, lift properties of the exhaust valves in the intake stroke are specified to achieve the minimum increase in the temperatures at the end of the compression stroke.

According to one aspect of the invention, a diesel engine for a vehicle is provided, which includes an engine body to be mounted in the vehicle and supplied with fuel containing diesel fuel as its main component, a geometric compression ratio $\epsilon$ being set within a range of 12:1 to 15:1. The engine body has an intake valve for opening and closing an intake port communicating an intake passage with a cylinder, an exhaust valve for opening and closing an exhaust port communicating an exhaust passage with the cylinder, and an exhaust gas re-circulation passage communicating the intake passage with the exhaust passage and for partially re-circulating exhaust gas to the intake passage.

When the engine body is at least in an operating state with comparatively low load and low rotation speed, the exhaust valve is opened during an intake stroke so that the exhaust gas is partially introduced into the cylinder and the intake passage is choked. The exhaust valve that is opened during the intake stroke is closed before the intake valve is closed in the later stage of the intake stroke.

An opening area $S_E$ [mm·deg] of the exhaust valve, that is defined by a lift curve of the exhaust valve in the intake stroke, is set so that a ratio $S_E/S_I$ of the opening area $S_E$ of the exhaust valve to an opening area $S_I$ [mm·deg] of the intake valve, that is defined by a lift curve of the intake valve, meets a relation of:

$$0.01 \times (15-\epsilon) + 0.02 \leq S_E/S_I \leq 0.17 \qquad \text{Statement (1),}$$

with respect to the geometric compression ratio $\epsilon$ of the engine body.

Here, the opening area $S_I$ [mm·deg] of the intake valve is defined as an area under the lift curve of the intake valve where a horizontal axis of the lift curve indicates a crank angle $\theta$ [deg] and a vertical axis indicates a lift amount $L_I(\theta)$ [mm] of the intake valve, that corresponds to a valve opening period $(\theta_{IC}-\theta_{IO})$ of the intake valve $(S_I=\int_{\theta_{IO}}^{\theta_{IC}} L_I(\theta) \cdot d\theta)$. Similarly, the opening area $S_E$ [mm·deg] of the exhaust valve is defined as an area under the lift curve of the exhaust valve in the intake stroke where a horizontal axis of the lift curve indicates the crank angle $\theta$ [deg] and a vertical axis indicates a lift amount $L_E(\theta)$ [mm] of the exhaust valve in the intake stroke, that corresponds to a valve opening period $(\theta_{EC}-\theta_{EO})$ of the exhaust valve $(S_E=\int_{\theta_{EO}}^{\theta_{EC}} L_E(\theta) \cdot d\theta)$.

Further, the timing for closing the exhaust valve during the intake stroke is set earlier by a predetermined timing compared to the timing for closing the intake valve in the later stage of the intake stroke or the earlier stage of the compression stroke. Therefore, the exhaust valve is set so as not to open in the earlier stage of the intake stroke and to open within a range of the middle to later stage of the intake stroke. Note that, each of the lift curves of the intake and exhaust valves is partitioned into a shock absorbing area on the opening side, a bulge area and a shock absorbing area on the closing side. Boundary points between the flat area on the opening side and the bulge area in the lift curves may be set as the opening timings of the intake and exhaust valves respectively, and boundary points between the bulge area and the flat area on the closing side in the lift curves may be set as the closing timings of the intake and exhaust valves respectively. Specifically, points where the intake and exhaust valves are lifted by 0.5 mm may be set as the opening and closing timings of the intake and exhaust valves respectively.

Lift properties of the intake valve in the intake stroke are clearly determined as basic properties of the engine, and therefore, the intake valve opening area $S_I$ is set to be constant at a predetermined value. Thus, the exhaust valve opening area $S_E$ is in proportion to the ratio $S_E/S_I$ of the exhaust valve opening area $S_E$ to the intake valve opening areas $S_I$, that is, the ratio $S_E/S_I$ increases as the exhaust valve opening area $S_E$ is enlarged. Therefore, setting the exhaust valve opening area $S_E$ to satisfy $0.01 \times (15-\epsilon) + 0.02 \leq S_E/S_I$ is equivalent to enlarging the exhaust valve opening area $S_E$ by more than a predetermined value. That is, satisfying the Statement (1) means enlarging the exhaust valve opening area $S_E$ by more than the predetermined value and introducing over a predetermined amount of internal EGR gas into the cylinder so as to raise a temperature of the cylinder at the end of a compression stroke, and thereby, self-ignition conditions are satisfied.

That is, as described below, the valve opening area ratio $S_E/S_I$, which is a parameter included in the Statement (1), is also a parameter related to the amount of the internal EGR gas to be introduced into the cylinder while amounts of new air and external EGR gas to be introduced into the cylinder (amount of the exhaust gas which is re-circulated through the exhaust re-circulation passage) during the intake stroke are taken into consideration. Further, as described above, the valve opening area ratio $S_E/S_I$ has properties in which the amount of the internal EGR gas to be introduced into the cylinder increases as the valve opening area ratio $S_E/S_I$ is increased and the amount of the internal EGR gas decreases as the valve opening area ratio $S_E/S_I$ is decreased. A minimum value of the valve opening area ratio $S_E/S_I$ in the Statement (1), indicated as $0.01 \times (15-\epsilon)+0.02$, is a minimum value required to satisfy the self-ignition conditions with respect to the geometric compression ratio $\epsilon$ of the engine body, and, by setting the valve opening area ratio $S_E/S_I$ to the minimum value or higher, the required minimum amount of the internal EGR gas is introduced into the cylinder and the temperature of the cylinder at the end of the compression stroke increases enough to satisfy the self-ignition conditions.

The self-ignition conditions which are set to establish the above described mathematical statements are preferred to assume that fuel with the worst possible ignitability is used, and the Statement (1) is established with respect to fuel with the lowest cetane number to be used in the engine body. Thereby, as long as the Statement (1) is satisfied, the self-ignition conditions can be satisfied even when the fuel with the lowest cetane number is used. Therefore, when fuel with comparatively higher cetane number is used, it is needless to say that the self-ignition conditions can be satisfied by satisfying the Statement (1).

Further, the minimum value of the valve opening area ratio $S_E/S_I$ in the Statement (1) decreases as the geometric compression ratio $\epsilon$ increases and the minimum value increases as the geometric compression ratio $\epsilon$ decreases. That is, because the temperature of the cylinder at the end of the compression stroke increases as the geometric compression ratio $\epsilon$ increases, the minimum temperature increase amount required to satisfy the self-ignition conditions becomes less and the amount of the internal EGR gas which needs to be introduced into the cylinder becomes less. On the other hand, because the temperature of the cylinder at the end of the compression stroke decreases as the geometric compression ratio $\epsilon$ decreases, the minimum temperature increase amount required to satisfy the self-ignition conditions increases and the amount of the internal EGR gas required to be introduced into the cylinder becomes greater.

Further, the minimum value of the valve opening area ratio $S_E/S_I$ in the Statement (1) is derived for a condition in which the engine body is operated with an excess air ratio $\lambda=1.0$. That is, considering an exhaust emission performance for soot and NOx, the engine body is preferably operated with the excess air ratio $\lambda$ of around 1.0. Thus, the minimum value is set in consideration of the exhaust gas amount (external EGR gas amount) to be re-circulated to the intake side through the exhaust gas re-circulation passage under the condition in which the intake passage is choked to achieve the excess air ratio $\lambda=1.0$. Meanwhile, the engine body may be operated with the excess air ratio $\lambda=1.1$ considering a load variation of the engine body in response to, for example, acceleration. In this case, the exhaust valve opening area $S_E$ is set so that the valve opening area ratio $S_E/S_I$ satisfies:

$$0.01 \times (15-\epsilon)+0.025 \leq S_E/S_I \leq 0.17 \qquad \text{Statement (1-2)}.$$

That is, by changing the air excess ratio $\lambda$ from 1.0 to 1.1 while having the same compression ratio, the minimum value of the valve opening area ratio $S_E/S_I$ is increased and the required minimum size of the exhaust valve opening area $S_E$ is enlarged. In other words, the amount of the internal EGR gas needs to be increased because the amount of the external EGR gas passed through the exhaust re-circulation passage decreases as a result of the reduction of a negative intake air pressure, while the degree of throttling in the intake passage is reduced to increase the new air amount corresponding to the increase of the air excess ratio $\lambda$ from 1.0 to 1.1. Therefore, the decreased amount of the external EGR gas needs to be compensated by enlarging the exhaust valve opening area, in other words, by increasing the amount of the internal EGR gas.

The maximum value "0.17" of the valve opening area ratio $S_E/S_I$ in the Statements (1) and (1-2) is set under the condition in which the engine body is operated with the air excess ratio $\lambda=1.1$. That is, setting the exhaust valve opening area $S_E$ comparatively larger so that the valve opening area ratio $S_E/S_I$ becomes larger than 0.17 causes excessive increase of the amount of EGR gas to be introduced into the cylinder, and the new air amount required to satisfy the excess ratio $\lambda=1.1$ exceeds the capacity of the cylinder and cannot be introduced into the cylinder.

Thus, by setting the exhaust valve opening area $S_E$ to satisfy either one of the Statements (1) and (1-2) and correspondingly setting the lift properties of the exhaust valve in the intake stroke, the ignitability of the fuel can surely be secured even when the engine body is in low load and low rotation speed and the fuel with low ignitability is used. Therefore, the diesel engine with comparatively low compression ratio in which the geometric compression ratio is set within a range of 12:1 to 15:1 can be realized. The diesel engine with the low compression ratio has a high exhaust emission performance by significantly reducing the discharge amount of NOx due to subsiding of combustion, and excels in fuel consumption performance due to increased thermal efficiency from reduced mechanical resistance loss.

According to one aspect of the invention, a diesel engine is provided. When the engine body is at least in an operating state with comparatively low load and low rotation speed, the exhaust valve is opened during an intake stroke so that the exhaust gas is partially introduced into the cylinder and the intake passage is not choked. The exhaust valve that is opened during the intake stroke is closed before the intake valve is closed in the later stage of the intake stroke.

An opening area $S_E$ [mm·deg] of the exhaust valve, that is defined by a lift curve of the exhaust valve in the intake stroke, is set so that a ratio $S_E/S_I$ of the opening area $S_E$ of the exhaust valve to an opening area $S_I$ [mm·deg] of the intake valve, that is defined by a lift curve of the intake valve, meets a relation of:

$$0.03 \times (15-\epsilon)+0.03 \leq S_E/S_I \leq 0.17 \qquad \text{Statement (2)},$$

with respect to the geometric compression ratio $\epsilon$ of the engine body.

Here, the term, the intake passage is "not choked", includes cases in which a throttle valve is not provided within the intake passage, and the throttle valve is provided within the intake passage but is fully opened in the operating state with comparatively low load and low rotation speed.

Because the negative intake air pressure is reduced due to not throttling the intake passage, the amount of the external EGR gas passed through the exhaust re-circulation passage may decrease compared to when the intake passage is choked. In the Statement (2), the minimum value of the valve opening area ratio $S_E/S_I$ is set larger with respect to the Statement (1). That is, by setting the exhaust valve opening area $S_E$ comparatively larger, the amount of the internal EGR gas increases and the temperature of the cylinder at the end of the compression stroke is further increased. Because the reduction of the negative intake air pressure reduces the amount of the internal EGR gas in the same valve opening area ratio, when the intake passage is not choked, the valve opening area ratio $S_E/S_I$ needs to have a greater variation so as to increase the amount of the internal EGR gas. Thereby a difference in slope between the Statements (1) and (2) is generated.

According to one aspect of the invention, a diesel engine is provided. When the engine body is at least in an operating state with comparatively low load and low rotation speed, the exhaust valve is opened during an intake stroke so that the exhaust gas is partially introduced into the cylinder and the intake passage is choked. The exhaust valve that is opened during the intake stroke is opened at a predetermined time after the intake valve is opened.

An opening area $S_E$ [mm·deg] of the exhaust valve, that is defined by a lift curve of the exhaust valve in the intake stroke, is set so that a ratio $S_E/S_I$ of the opening area $S_E$ of the exhaust valve to an opening area $S_I$ [mm·deg] of the intake valve, that is defined by a lift curve of the intake valve, meets a relation of:

$$0.01 \times (15-\epsilon)+0.03 \leq S_E/S_I \leq 0.15 \quad \text{Statement (3)},$$

with respect to the geometric compression ratio $\epsilon$ of the engine body.

Here, "the exhaust valve is opened at a predetermined time after the intake valve is opened" may be restated that the exhaust valve is opened after top dead center in the intake stroke. That is, when the exhaust valve is opened and closed during the exhaust stroke and further opened during the following intake stroke, the exhaust valve is required to be opened after a predetermined shock absorbing period has passed since the time the exhaust valve has closed. In other words, the exhaust valve is opened in the earlier stage of the intake stroke, and the internal EGR gas is introduced into the cylinder at least in the earlier stage of the intake stroke. When the internal EGR gas is introduced into the cylinder at least in the earlier stage of the intake stroke, the new air is harder to be introduced into the cylinder compared to when the exhaust valve is closed in the earlier stage of the intake stroke. Therefore, the maximum value of the valve opening area ratio $S_E/S_I$ in the Statement (3) is set to "0.15" so as to be lower than the maximum value "0.17" of the valve opening area ratio $S_E/S_I$ in the above described statements, such as the Statement (1). Similar to the case where $S_E/S_I=0.17$, the value "0.15" is a maximum value when the air excess ratio $\lambda=1.1$. Because the new air is harder to be introduced into the cylinder, the amount of the internal EGR gas needs to be restricted otherwise the amount of the new air in the cylinder is reduced and the air excess ratio $\lambda=1.1$ cannot be satisfied.

Further, the Statement (3) is established for the case when the intake passage is choked to satisfy the air excess ratio $\lambda=1.0$, and the minimum value of the valve opening area ratio $S_E/S_I$ in the Statement (3) is greater than that in the Statement (1) because the intake passage needs to be not choked or choked comparatively little to satisfy the air excess ratio $\lambda=1.0$ due to the new air being harder to be introduced into the cylinder under the condition based on the Statement (3) as described above and thus the negative intake air pressure is comparatively decreased and the amount of external EGR gas is reduced. That is, the exhaust valve opening area $S_E$ needs to be set large enough to increase the amount of the internal EGR gas so as to compensate for the reduced amount of the external EGR gas.

Furthermore, as for the conditions in the Statement (3), when the engine body is operated with the air excess ratio $\lambda=1.1$, the exhaust valve opening area $S_E$ is set so that the valve opening area ratio $S_E/S_I$ satisfies:

$$0.01 \times (15-\epsilon)+0.035 \leq S_E/S_I \leq 0.15 \quad \text{Statement (3-2)}.$$

According to one aspect of the invention, a diesel engine is provided. When the engine body is at least in an operating state with comparatively low load and low rotation speed, the exhaust valve is opened during an intake stroke so that the exhaust gas is partially introduced into the cylinder and the intake passage is not choked. The exhaust valve that is opened during the intake stroke is opened at a predetermined time after the intake valve is opened.

An opening area $S_E$ [mm·deg] of the exhaust valve, that is defined by a lift curve of the exhaust valve in the intake stroke, is set so that a ratio $S_E/S_I$ of the opening area $S_E$ of the exhaust valve to an opening area $S_I$ [mm·deg] of the intake valve, that is defined by a lift curve of the intake valve, meets a relation of:

$$0.03 \times (15-\epsilon)+0.04 \leq S_E/S_I \leq 0.15 \quad \text{Statement (4)},$$

with respect to the geometric compression ratio $\epsilon$ of the engine body.

The engine body may have two intake valves and two exhaust valves per cylinder, and only one of the exhaust valves may be opened while both of the two intake valves is opened, during the intake stroke. Note that, in all of the Statements (1), (1-2), (2), (3), (3-2) and (4), the calculated intake valve opening area $S_I$ is for both the two intake valves and the calculated exhaust valve opening area $S_E$ is for one of the exhaust valve.

Each of the intake and exhaust valves may be a poppet valve that lifts according to a predetermined lift curve. The lift curve of the intake valve and the lift curve of the exhaust valve (particularly the lift curve of the exhaust valve in the intake stroke when the exhaust valve is opened) may have shapes similar to each other.

In the above described Statements, the valve opening area ratio $S_E/S_I$ is adopted as parameters representing the lift properties of the exhaust valve in the intake stroke and further as parameters related to the amount of the internal EGR gas to be introduced into the cylinder. However, the opening period $(\theta_{EC}-\theta_{EO})$ of the exhaust valve in the intake stroke may be adopted as the parameter related to the amount of the internal EGR gas to be introduced into the cylinder, for example. That is, the amount of the internal EGR gas is increased and the temperature increase amount at the end of the compression stroke is increased as the opening period $(\theta_{EC}-\theta_{EO})$ becomes longer and, on the other hand, the amount of the internal EGR gas is reduced and the temperature increase amount at the end of the compression stroke is reduced as the opening period $(\theta_{EC}-\theta_{EO})$ becomes shorter.

According to one aspect of the invention, a diesel engine is provided. When the engine body is at least in an operating state with comparatively low load and low rotation speed, the exhaust valve is opened during an intake stroke so that the exhaust gas is partially introduced into the cylinder and the intake passage is choked. The exhaust valve that is opened during the intake stroke is closed before the intake valve is closed in the later stage of the intake stroke.

An opening period $(\theta_{EC}-\theta_{EO})$ [deg] of the exhaust valve in the intake stroke (here, points at which the exhaust valve is lifted by 0.5 mm are defined as an opening timing $\theta_{EO}$ and a closing timing $\theta_{EC}$) meets a relation of:

$$9\times(15-\epsilon)+95\leq(\theta_{EC}-\theta_{EO})\leq160[\text{deg}] \quad \text{Statement (5),}$$

with respect to the geometric compression ratio $\epsilon$ of the engine body.

The minimum value of the opening period ($\theta_{EC}-\theta_{EO}$) in the Statement (5) is the value when the air excess ratio $\lambda=1.0$. When the air excess ratio $\lambda=1.1$, a statement:

$$9\times(15-\epsilon)+98\leq(\theta_{EC}-\theta_{EO})\leq160[\text{deg}] \quad \text{Statement (5-2)}$$

can be established. Note that, maximum value "160" in the Statements (5) and (5-2) is the value when the air excess ratio $\lambda=1.1$.

According to one aspect of the invention, a diesel engine is provided. When the engine body is at least in an operating state with comparatively low load and low rotation speed, the exhaust valve is opened during an intake stroke so that the exhaust gas is partially introduced into the cylinder and the intake passage is not choked. The exhaust valve that is opened during the intake stroke is closed before the intake valve is closed in the later stage of the intake stroke.

An opening period ($\theta_{EC}-\theta_{EO}$) [deg] of the exhaust valve in the intake stroke (here, points at which the exhaust valve is lifted by 0.5 mm are defined as an opening timing $\theta_{EO}$ and a closing timing $\theta_{EC}$) meets a relation of:

$$14\times(15-\epsilon)+105\leq(\theta_{EC}-\theta_{EO})\leq160[\text{deg}] \quad \text{Statement (6),}$$

with respect to the geometric compression ratio $\epsilon$ of the engine body.

According to one aspect of the invention, a diesel engine is provided. When the engine body is at least in an operating state with comparatively low load and low rotation speed, the exhaust valve is opened during an intake stroke so that the exhaust gas is partially introduced into the cylinder and the intake passage is choked. The exhaust valve that is opened during the intake stroke is opened at a predetermined time after the intake valve is opened.

An opening period ($\theta_{EC}-\theta_{EO}$) [deg] of the exhaust valve in the intake stroke (here, points at which the exhaust valve is lifted by 0.5 mm are defined as an opening timing $\theta_{EO}$ and a closing timing $\theta_{EC}$) meets a relation of:

$$9\times(15-\epsilon)+100\leq(\theta_{EC}-\theta_{EO})\leq155[\text{deg}] \quad \text{Statement (7),}$$

with respect to the geometric compression ratio $\epsilon$ of the engine body.

When the air excess ratio $\lambda=1.1$, a statement:

$$9\times(15-\epsilon)+103\leq(\theta_{EC}-\theta_{EO})\leq155[\text{deg}] \quad \text{Statement (7-2)}$$

can be established.

According to one aspect of the invention, a diesel engine is provided. When the engine body is at least in an operating state with comparatively low load and low rotation speed, the exhaust valve is opened during an intake stroke so that the exhaust gas is partially introduced into the cylinder and the intake passage is not choked. The exhaust valve that is opened during the intake stroke is opened at a predetermined time after the intake valve is opened.

An opening period ($\theta_{EC}-\theta_{EO}$) [deg] of the exhaust valve in the intake stroke (here, points at which the exhaust valve is lifted by 0.5 mm are defined as an opening timing $\theta_{EO}$ and a closing timing $\theta_{EC}$) meets a relation of:

$$9\times(15-\epsilon)+110\leq(\theta_{EC}-\theta_{EO})\leq155[\text{deg}] \quad \text{Statement (8),}$$

with respect to the geometric compression ratio $\epsilon$ of the engine body.

DESCRIPTION OF EMBODIMENT

Figure 1:
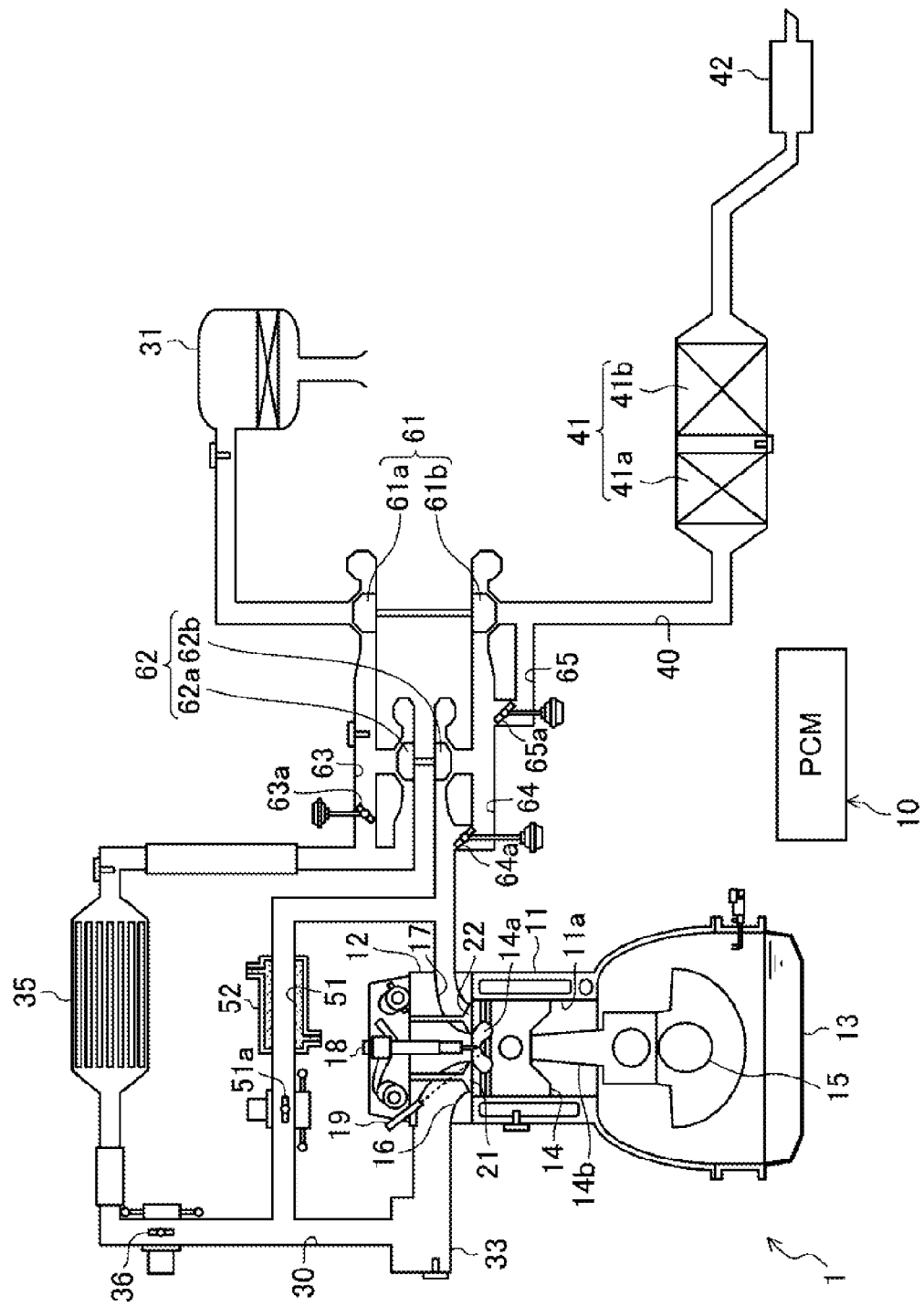
FIG. 1 is a schematic diagram showing a configuration of a diesel engine according to an embodiment.
Figure 2:
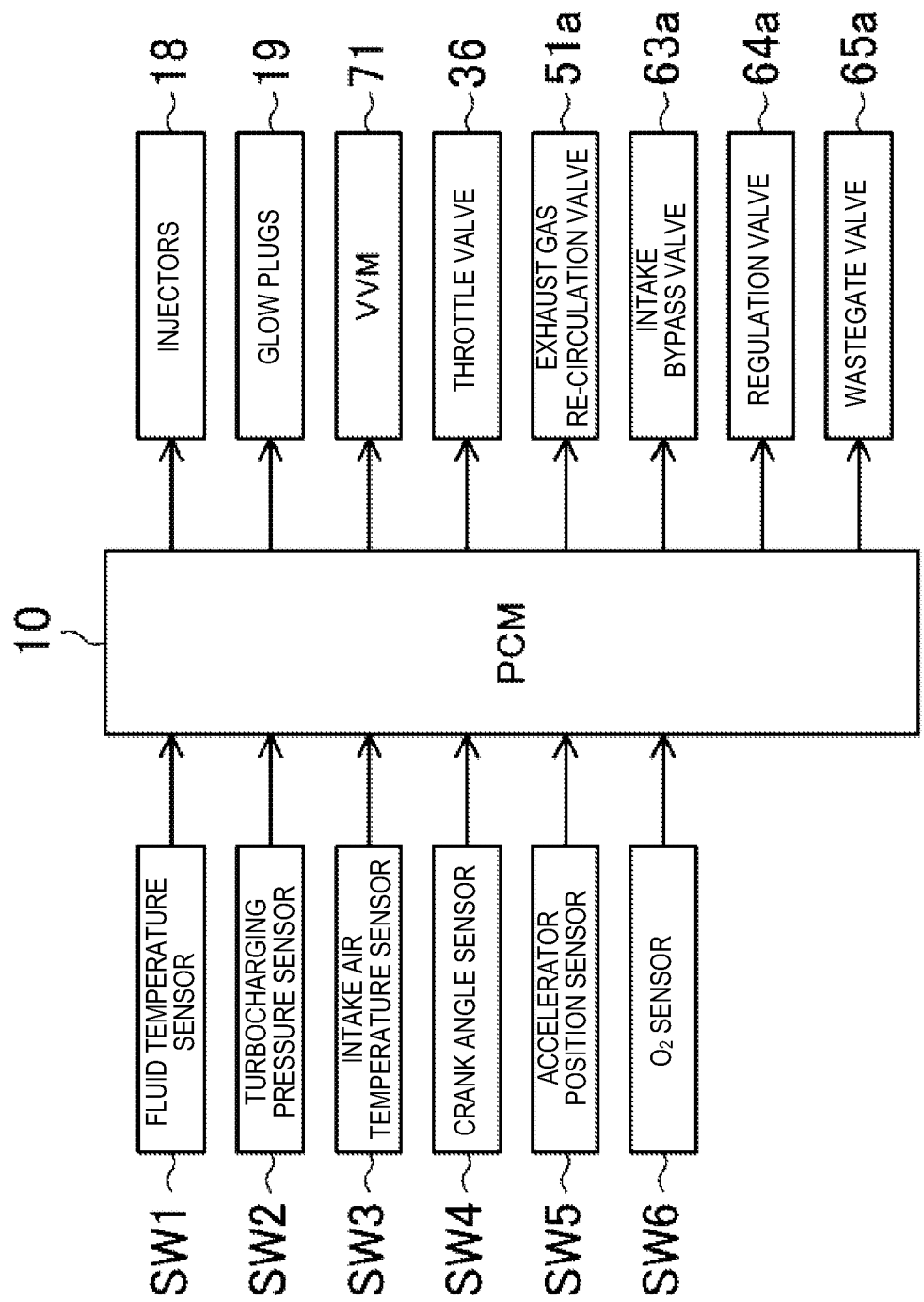
FIG. 2 is a block diagram relating to a control of the diesel engine.

Hereinafter, a diesel engine according to an embodiment of the present invention is described in detail with reference to the appended drawings. Note that, the following description of the preferred embodiment is merely an illustration. FIGS. 1 and 2 show schematic configurations of an engine 1 of the embodiment. The engine 1 is a diesel engine that is mounted in a vehicle and supplied with fuel in which a main component is diesel fuel. The diesel engine includes a cylinder block 11 provided with a plurality of cylinders 11a (only one cylinder is illustrated), a cylinder head 12 arranged on the cylinder block 11, and an oil pan 13 arranged below the cylinder block 11 and where a lubricant is stored. Inside the cylinders 11a of the engine 1, reciprocating pistons 14 are inserted, and cavities partially forming reentrant combustion chambers 14a are formed on top surfaces of the pistons 14, respectively. Each of the pistons 14 is coupled to a crank shaft 15 via a connecting rod 14b.

Figure 3:
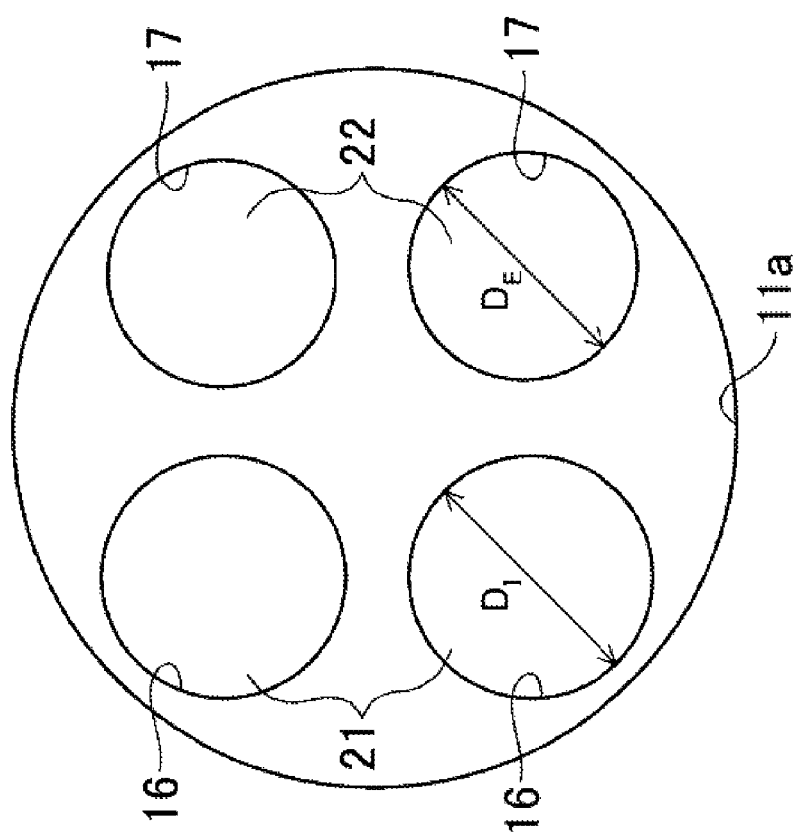
FIG. 3 is a view showing an example of arrangement of intake valves and exhaust valves in a cylinder.

In the cylinder head 12, intake ports 16 and exhaust ports 17 are formed and intake valves 21 for opening and closing the openings of the intake ports 16 on the combustion chambers 14a side and exhaust valves 22 for opening and closing the openings of the exhaust ports 17 on the combustion chambers 14a side are arranged for each of the cylinders 11a. As schematically shown in FIG. 3, each of the cylinders 11a is formed with two openings of the intake ports 16 and two openings of the exhaust ports 17, that is, each of the cylinders 11a is arranged with two intake valves 21 and two exhaust valves 22.

Within a valve system of the engine 1 for operating the intake and exhaust valves 21 and 22, a hydraulically-actuated switching mechanism 71 (see FIG. 2, hereinafter, it is referred to as VVM, variable valve motion) for switching an operation mode of the exhaust valves 22 between a normal mode and a special mode is provided on the exhaust valve side. The VVM 71 (a detailed configuration is not illustrated) includes a first cam having one cam nose and a second cam having two cam noses, that are two kinds of cams with cam profiles different from each other, and a lost motion mechanism for selectively transmitting an operation state of either one of the first and second cams to the exhaust valves 22. When the lost motion mechanism transmits the operation state of the first cam to the exhaust valves 22, the exhaust valves 22 operate in the normal mode and open only once during an exhaust stroke. On the other hand, when the lost motion mechanism transmits the operation state of the second cam to the exhaust valves 22, the exhaust valves 22 operate in the special mode and open during the exhaust stroke and further during an intake stroke once each, that is the exhaust valve is opened twice. In this embodiment, in each of the cylinders 11a, only one of the exhaust valves 22 opens during the intake stroke. Note that, in each of the cylinders 11a, clearly both of the exhaust valves 22 open during the exhaust stroke and both of the intake valves 21 open during the intake stroke.

The mode switching in the VVM 71 between the normal and special modes is performed by a hydraulic pressure applied by a hydraulic pump (not illustrated) operated by the engine. The special mode may be utilized for a control related to an internal EGR as described below. Note that, an electromagnetically-operated valve system for operating the exhaust valve 22 by using an electromagnetic actuator may be adopted for switching between the normal and special modes.

Injectors 18 for injecting the fuel and glow plugs 19 for improving an ignitability of the fuel by heating intake air under a cold state of the engine 1 are provided within the cylinder head 12. The injectors 18 are arranged so that fuel injection ports thereof face the combustion chambers 14a from ceiling surfaces of the combustion chambers 14a, respectively, and the injectors 18 supply the fuel to the combustion chambers 14a by directly injecting the fuel at the point near the top dead center in a compression stroke.

An intake passage 30 is connected to a side surface of the engine 1 so as to communicate with the intake ports 16 of the cylinders 11a. Meanwhile, an exhaust passage 40 for discharging burnt gas (exhaust gas) from the combustion chambers 14a of the cylinders 11a is connected to the other side surface of the engine 1. A large turbocharger 61 and a compact turbocharger 62 for turbocharging the intake air (described in detail below) are arranged in the intake and exhaust passages 30 and 40.

An air cleaner 31 for filtering the intake air is arranged in an upstream end part of the intake passage 30. A surge tank 33 is arranged near a downstream end of the intake passage 30. A part of the intake passage 30 on the downstream side of the surge tank 33 is branched to be independent passages extending toward the respective cylinders 11a, and downstream ends of the independent passages are connected with the intake ports 16 of the cylinders 11a.

A compressor 61a of the large turbocharger 61, a compressor 62a of the compact turbocharger 62, an intercooler 35 for cooling air compressed by the compressors 61a and 62a, and a throttle valve 36 for adjusting an intake air amount for the combustion chambers 14a of the cylinders 11a are arranged in the intake passage 30 between the air cleaner 31 and the surge tank 33. The throttle valve 36 is basically fully opened; however, it is fully closed when the engine 1 is stopped so as to prevent a shock.

A part of the exhaust passage 40 on the upstream side is constituted with an exhaust manifold having independent passages branched toward the cylinders 11a and connected with outer ends of the exhaust ports 17 and a merging part where the independent passages merge together.

In a part of the exhaust passage 40 on the downstream of the exhaust manifold, a turbine 62b of the compact turbocharger 62, a turbine 61b of the large turbocharger 61, an exhaust emission control device 41 for purifying hazardous components contained in the exhaust gas, and a silencer 42 are arranged in this order from the upstream.

The exhaust emission control device 41 includes an oxidation catalyst 41a and a diesel particulate filter 41b (hereinafter, referred to as the filter), and these components are arranged in this order from the upstream. The oxidation catalyst 41a and the filter 41b are accommodated in a case. The oxidation catalyst 41a has an oxidation catalyst carrying, for example, platinum or platinum added with palladium and promotes a reaction generating $CO_2$ and $H_2O$ by oxidizing CO and HC contained in the exhaust gas. The filter 41b catches particulates such as soot contained in the exhaust gas from the engine 1. Note that the filter 41b may be coated with the oxidation catalyst. As described later, the generation of NOx is significantly suppressed or prevented in the engine 1 because of the low compression ratio, therefore the NOx catalyst may not be used.

A part of the intake passage 30 between the surge tank 33 and the throttle valve 36 (that is, a part downstream of the compact compressor 62a of the compact turbocharger 62) and a part of the exhaust passage 40 between the exhaust manifold and the compact turbine 62b of the compact turbocharger 62 (that is, a part upstream of the compact turbine 62b of the compact turbocharger 62) are connected with an exhaust gas re-circulation passage 51 for partially re-circulating the exhaust gas to the intake passage 30. An exhaust gas re-circulation valve 51a for adjusting a re-circulation amount of the exhaust gas to the intake passage 30, and an EGR cooler 52 for cooling the exhaust gas by engine coolant, are arranged in the exhaust gas re-circulation passage 51.

The large turbocharger 61 has the large compressor 61a arranged in the intake passage 30 and the large turbine 61b arranged in the exhaust passage 40. The large compressor 61a is arranged in the intake passage 30 between the air cleaner 31 and the intercooler 35. The large turbine 61b is arranged in the exhaust passage 40 between the exhaust manifold and the oxidation catalyst 41a.

The compact turbocharger 62 has the compact compressor 62a arranged in the intake passage 30 and the compact turbine 62b arranged in the exhaust passage 40. The compact compressor 62a is arranged in the intake passage 30 on the downstream of the large compressor 61a. The compact turbine 62b is arranged in the exhaust passage 40 on the upstream of the large turbine 61b.

That is, the large compressor 61a and the compact compressor 62a are arranged in series in the intake passage 30 in this order from the upstream, and the compact turbine 62b and the large turbine 61b are arranged in series in the exhaust passage 40 in this order from the upstream. The large and compact turbines 61b and 62b are rotated by the flow of the exhaust gas, and the large and compact compressors 61a and 62a coupled with the large and compact turbines 61b and 62b are actuated by the rotation of the large and compact turbines 61b and 62b respectively.

The compact turbocharger 62 is smaller and the large turbocharger 61 is larger in relation to each other. That is, inertia of the large turbine 61b of the large turbocharger 61 is larger than that of the compact turbine 62b of the compact turbocharger 62.

A small intake bypass passage 63 for bypassing the small compressor 62a is connected with the intake passage 30. A small intake bypass valve 63a for adjusting an amount of the air flowing into the small intake bypass passage 63 is arranged in the small intake bypass passage 63. The small intake bypass valve 63a is fully closed (normally closed) when no electric power is distributed thereto.

A small exhaust bypass passage 64 for bypassing the small turbine 62b and a large exhaust bypass passage 65 for bypassing the large turbine 61b are connected with the exhaust passage 40. A regulation valve 64a for adjusting an amount of the exhaust gas flowing to the small exhaust bypass passage 64 is arranged within the small exhaust bypass passage 64, and a wastegate valve 65a for adjusting an exhaust gas amount flowing to the large exhaust bypass passage 65 is arranged in the large exhaust bypass passage 65. The regulation valve 64a and the wastegate 65a are both fully opened (normally opened) when no electric power is distributed thereto.

The diesel engine 1 with the configuration described as above is controlled by a powertrain control module 10 (hereinafter, may be referred to as PCM). The PCM 10 is configured by a CPU, a memory, a counter timer group, an interface, and a microprocessor with paths for connecting these units. The PCM 10 configures a control device. As shown in FIG. 2, the PCM 10 is inputted with detection signals from a fluid temperature sensor SW1 for detecting a temperature of an engine coolant, a turbocharging pressure sensor SW2 attached to the surge tank 33 and for detecting a pressure on the air to be supplied to the combustion chambers 14a, an intake air temperature sensor SW3 for detecting a temperature of the intake air, a crank angle sensor SW4 for detecting a rotational angle of the crank shaft 15, an accelerator position sensor SW5 for detecting an accelerator opening amount corresponding to an angle of an acceleration pedal (not illustrated) of the vehicle, and an $O_2$ sensor SW6 for detecting an oxygen concentration within the exhaust gas. The PCM 10 performs various kinds of calculations based on the detection signals so as to determine the states of the engine 1 and the vehicle, and further outputs control signals to the injectors 18, the glow plugs 19, the VVM 71 of the valve system, and the actuators of the valves 36, 51a, 63a, 64a and 65a according to the determined states.

Thus, the engine 1 is configured to have a comparatively low compression ratio where the geometric compression ratio is within a range of 12:1 to below 15:1, and thereby the exhaust emission performance is improved and a thermal efficiency is improved. On the other hand, as a result of setting the low geometric compression ratio, temperatures of the cylinders at the end of the compression stroke are decreased particularly within the operation range where the engine has a low load and low rotation speed, and therefore, a self ignition may be difficult be performed and self-ignition conditions may not be satisfied depending on the property of the fuel to be supplied (e.g., fuel with low cetane number).

For this reason, in the engine 1, a re-circulation of the exhaust gas (external EGR gas) through the exhaust gas re-circulation passage 51 and an introduction of the exhaust gas (internal EGR gas) into the cylinders 11a through the control by the VVM 71 are performed. Thereby, the temperatures of the cylinders 11a at the end of the compression stroke are increased by introducing a comparatively large amount of EGR gas into the cylinders 11a at least within the operation range where the engine has the low load and the low rotation speed. Particularly in the engine 1 with the low compression ratio, the one of the exhaust valves 22 which is opened during the intake stroke is set to have predetermined lift properties according to the geometric compression ratio of the engine so that the ignitability of the fuel is surely secured regardless of the operating conditions and the property of the fuel. Hereinafter, the lift properties of the one of the exhaust valves 22 are described with reference to the appended drawings.

Figure 4:
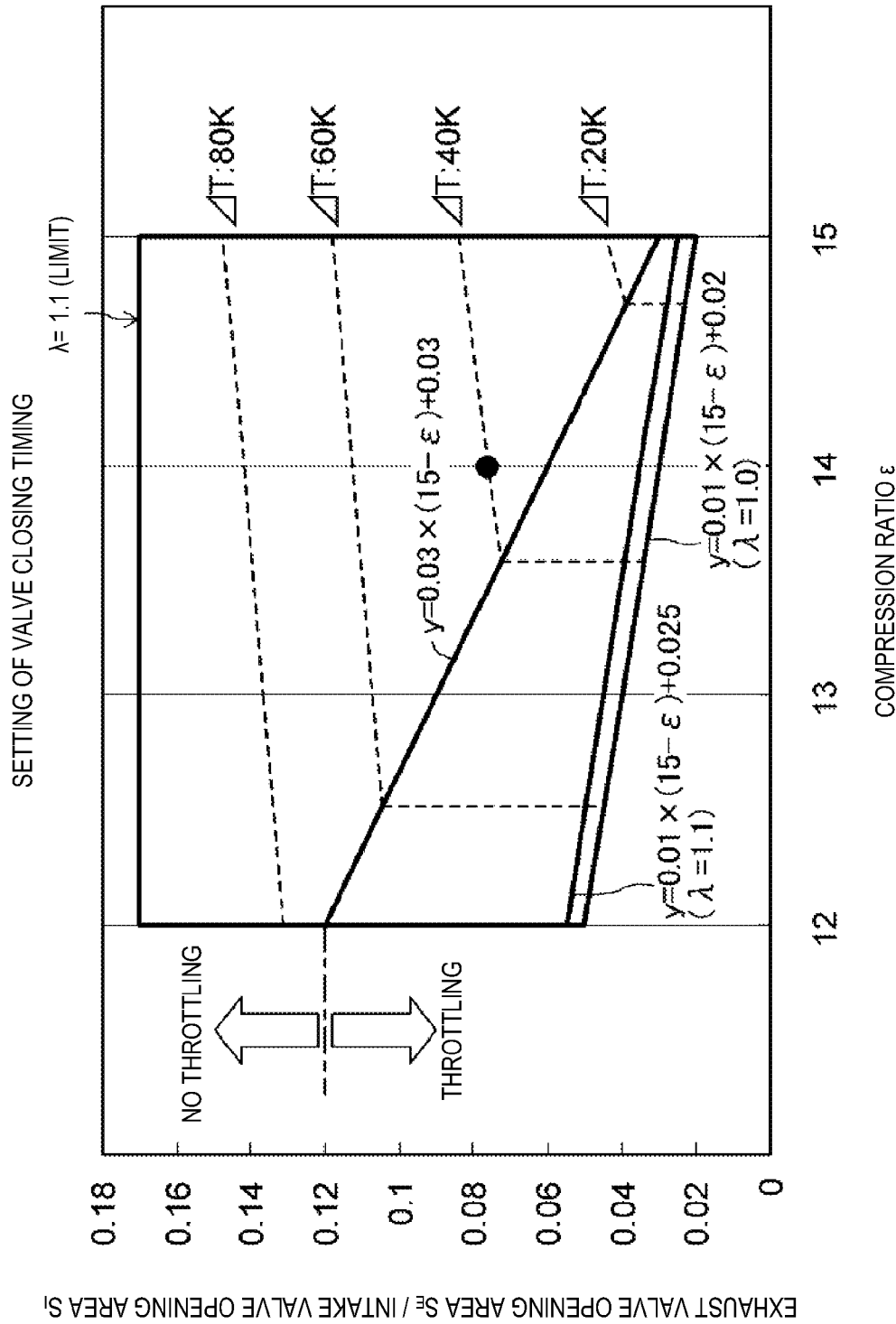
FIG. 4 is a contour chart relating to a temperature increase amount at the end of a compression stroke according to a relation between a geometric compression ratio $\epsilon$ of the engine and an opening area ratio $S_E/S_I$ of the intake and exhaust valves under a condition in which a timing for closing the exhaust valve is set to a predetermined timing.
Figure 5:
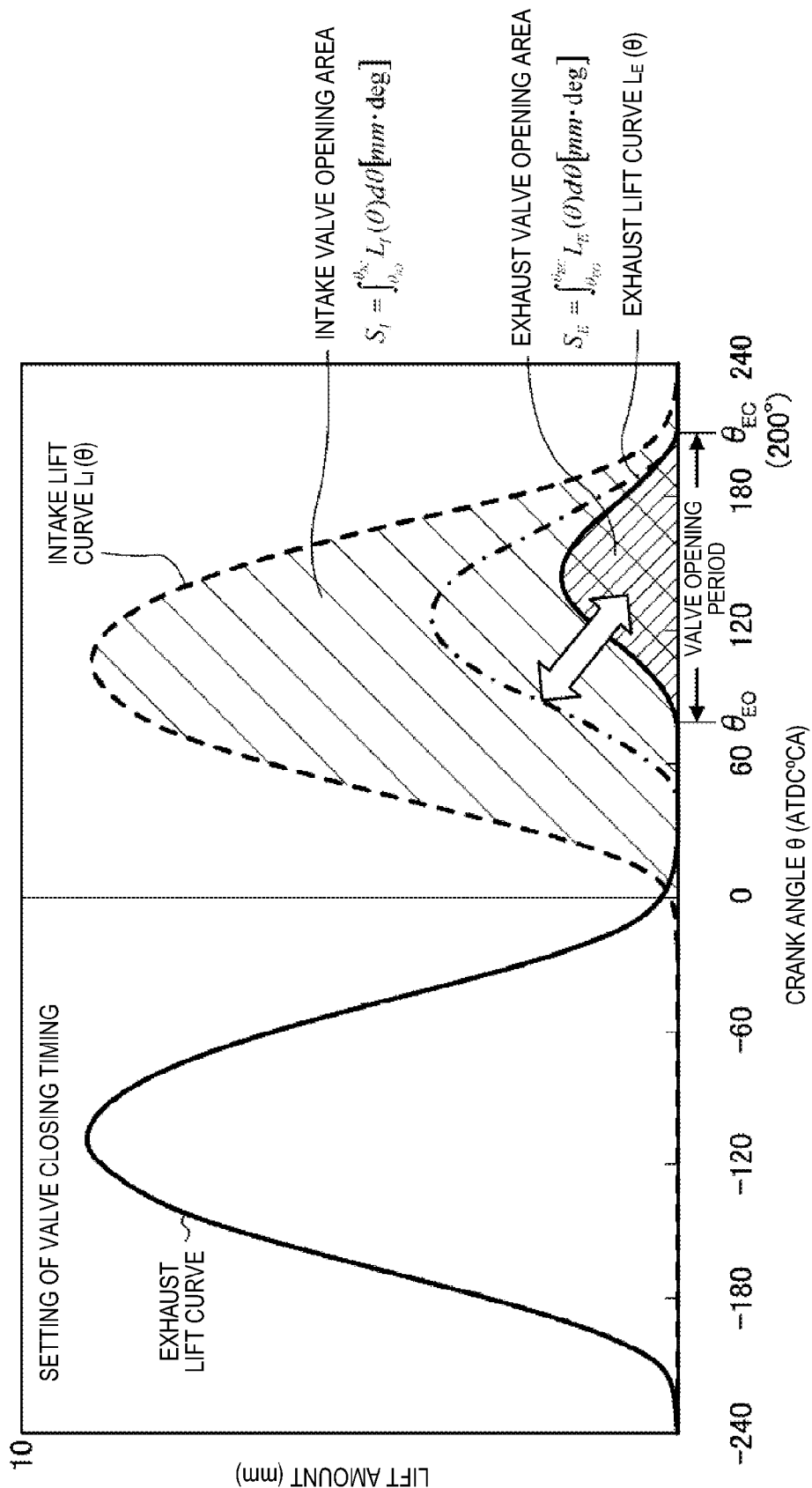
FIG. 5 is a chart showing an example of lift curves of the intake and exhaust valves under the condition in which the timing for closing the exhaust valve is set to the predetermined timing.

FIG. 4 is a chart indicating temperature increase amounts ($\Delta T$) at the end of the compression stroke determined based on a relation between the geometric compression ratio $\epsilon$ of the engine 1 (horizontal axis) and an area ratio $S_E/S_I$ of an exhaust valve opening area $S_E$ and an intake valve opening area $S_I$ (vertical axis). Here, the values of the exhaust valve opening area $S_E$ and the intake valve opening area $S_I$ are determined based on a lift curve of the one of the exhaust valves 22 (see the solid line in FIG. 5) and a lift curve of the intake valves 21 (see the dashed line in FIG. 5) respectively. That is, the exhaust valve opening area $S_E$ is defined as an area under the lift curve $L_E(\theta)$ of the exhaust valve 22 (limited to the lift curve in the intake stroke), that corresponds to a valve opening period ($\theta_{EC}-\theta_{EO}$) of the exhaust valve 22. Similarly, the intake valve opening area $S_I$ is defined as an area under the lift curve $L_I(\theta)$ of the intake valves 21, that corresponds to a valve opening period ($\theta_{IC}-\theta_{IO}$) of the intake valves 21. The valve opening periods ($\theta_{EC}-\theta_{EO}$) and ($\theta_{IC}-\theta_{IO}$) serve as functions of a crank angle $\theta$ (deg). That is:
exhaust valve opening area $S_E = \int_{\theta_{EO}}^{\theta_{EC}} L_E(\theta) d\theta$ [mm·deg]; and
intake valve opening area $S_I = \int_{\theta_{IO}}^{\theta_{IC}} L_I(\theta) d\theta$ [mm·deg].

However, in this embodiment, because both the two intake valves 21 are opened and, on the other hand, only one of the exhaust valves 22 is opened per cylinder during the intake stroke as described above, the exhaust valve opening area $S_E$ serves for the one of the exhaust valves 22 and the intake valve opening area $S_I$ serves for two of the intake valves 21 (that is, $S_I = \int_{\theta_{IO}}^{\theta_{IC}} L_I(\theta) d\theta \times 2$) in the above equation. Note that, in calculations of equations and mathematical statements below, a diameter $D_I$ of each of the intake valves 21 is set to 26 mm and a diameter $D_E$ of each of the exhaust valves 22 is set to 22.5 mm (see FIG. 3).

The lift curve of the exhaust valve 22 which is opened during the intake stroke and the lift curve of the intake valves 21 have shapes similar to each other. A timing for closing the exhaust valve 22 during the intake stroke is set to be earlier than a timing for closing the intake valves 21 in the later stage of the intake stroke. Specifically, the timing for closing the exhaust valve 22 is set at 200° CA after a top dead center in the intake stroke (hereinafter, the set timing may be referred to as "the condition in which the timing for closing the exhaust valve 22 is set"). Note that, each of the lift curves of the intake and exhaust valves 21 and 22 is partitioned into a shock absorbing area on the opening side, a bulge area and a shock absorbing area on the closing side. Boundary points between the shock absorbing area on the opening side and the bulge area in the lift curves may be set as the opening timings $\theta_C$ of the intake and exhaust valves 21 and 22 respectively, and boundary points between the bulge area and the shock absorbing area on the closing side in the lift curves may be set as the closing timings $\theta_C$ of the intake and exhaust valves 21 and 22 respectively. Further specifically, points where the intake and exhaust valves 21 and 22 are lifted by 0.5 mm may be set as the opening and closing timings of the intake and exhaust valves 21 and 22, respectively.

Because the exhaust valve 22 is closed in the earlier stage of the intake stroke under the condition in which the timing for closing the exhaust valve 22 is set, new air is introduced into the cylinders in the early stage of the intake stroke. Thus, it is particularly effective in increasing the engine load when, for example, accelerating the vehicle.

As described above, FIG. 4 is the contour chart (isogram chart) relating to the temperature increase amount ($\Delta T$) at the end of the compression stroke determined based on the relation between the geometric compression ratio $\epsilon$ of the engine 1 and the valve opening area ratio $S_E/S_I$. That is, the chart indicates changes in the temperature increase amount depending on changes in the valve opening area ratio $S_E/S_I$ which is set with respect to the geometric compression ratio $\epsilon$ of the engine 1, and the dashed line indicates an isothermal line of the temperature increase amount. The contour chart in FIG. 4 is obtained by performing a later described estimation-calculation of the temperature at the end of the compression stroke for every geometric compression ratio of the engine 1 under a predetermined operating condition of the engine 1, while varying the exhaust valve opening area $S_E$ by changing the lift curve of the exhaust valve 22, where its contour is kept approximately the same, under a condition in which the timing for closing the exhaust valve 22 during the intake stroke is not changed (200° C.A after the top dead center in the intake stroke) as indicated by the white arrow in FIG. 5.

Here, the intake valve opening area $S_I$ is set to a predetermined constant value based on the basic characteristics of the engine 1. Therefore, the valve opening area ratio $S_E/S_I$ indicated by the vertical axis in FIG. 4 changes in proportion to the change of the exhaust valve opening area $S_E$. In other words, the exhaust valve opening area $S_E$ is enlarged as the valve opening area ratio $S_E/S_I$ is increased, and thereby, the amount of the internal EGR gas to be introduced into the cylinders 11a increases. Further, the exhaust valve opening area $S_E$ is reduced as the valve opening area ratio $S_E/S_I$ is decreased, and thereby, the amount of the internal EGR gas to be introduced into the cylinders 11a is reduced.

The thick solid lines in FIG. 4 indicate the minimum valve opening area ratios $S_E/S_I$ required to satisfy the self-ignition conditions under predetermined operating conditions of the engine 1 on the comparatively low load and low rotation speed side. That is:

$$y=0.01\times(15-\epsilon)+0.02 \qquad \text{Equation (1a)}.$$

The Equation (1a) indicates a minimum value of the valve opening area ratio $S_E/S_I$ when the throttle valve 36 is throttled so that an excess air ratio $\lambda=1.0$. By setting the valve opening area ratio $S_E/S_I$ to be the minimum value or greater, the self-ignition conditions are satisfied. That is, the self-ignition conditions are satisfied because a required size of the exhaust valve opening area $S_E$ is secured, thereby, the amount of the EGR gas to be introduced into the cylinders 11a exceeds a predetermined value and the temperature increase amount at the end of the compression stroke exceeds a predetermined value. Here, the self-ignition conditions required in the calculation of the minimum value is set with respect to fuel with the worst ignitability (fuel with the lowest cetane number). Thereby, the ignition conditions can be satisfied even when the fuel with the lowest cetane number is used. Note that, when fuel with higher cetane number is used, the self-ignition conditions correspondingly become easier to be met and naturally be satisfied.

Here, the minimum value indicated by the Equation (1a) decreases as the geometric compression ratio $\epsilon$ increases and the value increases as the geometric compression ratio $\epsilon$ decreases. That is, because the temperatures of the cylinders at the end of the compression stroke increase as the geometric compression ratio $\epsilon$ increases, the minimum temperature increase amount required to satisfy the self-ignition conditions becomes less and the amount of the internal EGR gas which needs to be introduced into the cylinders 11a becomes less. On the other hand, because the temperatures of the cylinders at the end of the compression stroke decrease as the geometric compression ratio $\epsilon$ decreases, the minimum temperature increase amount required to satisfy the self-ignition conditions increases and a larger amount of the internal EGR gas is required to be introduced into the cylinders 11a.

As described above, the Equation (1a) indicates the minimum value derived for a condition in which the engine 1 is operated with the excess air ratio $\lambda=1.0$. That is, based on that the engine 1 is preferably operated with the excess air ratio $\lambda$ of around 1.0 considering an exhaust emission performance for soot and NOx, the Equation (1a) is established in consideration of the exhaust gas amount (external EGR gas amount) to be re-circulated to the intake side through the exhaust gas re-circulation passage 51 under the condition in which the throttle valve 36 is throttled to achieve the excess air ratio $\lambda=1.0$. Meanwhile, the engine 1 may be operated with the excess air ratio $\lambda=1.1$ considering a load variation of the engine 1 in response to, for example, acceleration. In this case, the minimum value of the valve opening area ratio $S_E/S_I$ is indicated as follows:

$$y=0.01\times(15-\epsilon)+0.025 \qquad \text{Equation (1b)}.$$

As shown in FIG. 4, the minimum value of the valve opening area ratio $S_E/S_I$ shifts to be higher due to the change of the excess air ratio $\lambda$ from 1.0 to 1.1 because the amount of the external EGR gas passed through the exhaust gas re-circulation passage 51 is reduced as a result of the reduction of the negative intake air pressure while the throttled amount of the throttle valve 36 is reduced to increase the new air corresponding to the shift of the excess air ratio from 1.0 to 1.1. Therefore, the reduced amount of the external EGR gas is required to be compensated by enlarging the valve opening area $S_E$ of the exhaust valve 22, in other words increasing the amount of the internal EGR gas.

As described above, the internal EGR gas amount increases as the valve opening area ratio $S_E/S_I$ increases, and it is effective in increasing the temperatures of the cylinders at the end of the compression stroke. However, increasing the valve opening area ratio $S_E/S_I$ (in other words, enlarging the opening area of the exhaust valve 22 in the intake stroke) so as to increase the internal EGR gas amount causes a reduction of the new air to be introduced into the cylinders 11a through the intake valves 21. Therefore, a maximum value of the valve opening area ratio $S_E/S_I$ may be set in view of securing the amount of the new air required to operate the engine 1 with the predetermined excess air ratio $\lambda$. The thick solid line indicating the valve opening area ratio $S_E/S_I=0.17$ in FIG. 4 indicates the maximum value of the valve opening area ratio $S_E/S_I$ which is set to maintain the excess air ratio $\lambda=1.1$. The maximum value of the valve opening area ratio $S_E/S_I$ is constant regardless of the geometric compression ratio of the engine 1 since there is no relation therebetween.

Therefore, based on the Equation (1a), by setting the exhaust valve opening area $S_E$ and, as a result, setting the lift properties of the exhaust valve 22 in the intake stroke so as to satisfy the following mathematical statement for the valve opening area ratio $S_E/S_I$:

$$0.01\times(15-\epsilon)+0.02 \leq S_E/S_I \leq 0.17 \qquad \text{Statement (1)},$$

the engine 1 can satisfy the self-ignition conditions even with the low compression ratio, and the ignitability of the fuel can surely be secured regardless of the operation state of the engine or the property of the fuel.

Further, considering the case of the Equation (1b), the exhaust valve opening area $S_E$ may be set to satisfy the following mathematical statement for the valve opening area ratio $S_E/S_I$:

$$0.01\times(15-\epsilon)+0.025 \leq S_E/S_I \leq 0.17 \qquad \text{Statement (1-2).}$$

The above described equations and mathematical statements are established for the condition in which, by throttling the throttle valve 36, the exhaust gas easily re-circulates through the exhaust gas re-circulation passage 51; however, in the diesel engine where the throttle valve 36 is not throttled within the operation range in which, for example, the engine has the low load and low speed or where the throttle valve is not provided in the intake passage 30 in the first place, the amount of the external EGR gas to be introduced into the cylinders 11a is comparatively reduced due to the reduction of the negative intake air pressure, and therefore, different equations and mathematical statements are established for this case. Specifically, the minimum value of the valve opening area ratio $S_E/S_I$ without the throttling is indicated as follows:

$$y=0.03\times(15-\epsilon)+0.03 \qquad \text{Equation (2a).}$$

As shown in FIG. 4, the minimum value of the valve opening area ratio $S_E/S_I$ increases by not performing the throttling because the amount of the internal EGR gas is required to be increased as the amount of the external EGR gas to be introduced into the cylinders 11a is reduced corresponding to no throttling of the intake passage 30. Because of the reduction of the negative intake air pressure by not performing the throttling reduces the amount of the internal EGR gas in the same valve opening area ratio, the valve opening area ratio $S_E/S_I$ needs to have a greater variation so as to increase the amount of the internal EGR gas when the intake passage 30 is not choked. Thereby a difference in slope between the above equations (e.g., the Equation (1a)) and the Equation (2a) is generated.

Meanwhile, similar to the above case, the maximum value of the valve opening area ratio $S_E/S_I$ is set in the same manner regardless of the throttling so as to maintain the air excess ratio $\lambda=1.1$.

Therefore, under the condition in which the throttling is not performed, by setting the exhaust valve opening area $S_E$ and, as a result, setting the lift properties of the exhaust valve 22 in the intake stroke based on the Equation (2a) so as to satisfy the following mathematical statement for the valve opening area ratio $S_E/S_I$:

$$0.03\times(15-\epsilon)+0.03 \leq S_E/S_I \leq 0.17 \qquad \text{Statement (2),}$$

the engine 1 can satisfy the self-ignition conditions even with the low compression ratio, and the ignitability of the fuel can surely be secured regardless of the operation state of the engine or the property of the fuel.

For example, as indicated by the black circle in FIG. 4, by setting the valve opening area ratio $S_E/S_I$ to be just below 0.08 when the engine compression ratio of the engine is set to 14:1 and correspondingly setting the cam profile of the second cam of the VVM 71 (the above described cam for opening the exhaust valve 22 during the intake stroke), the temperature increase amount obtained is about 40K (kelvin). Thereby, even when the fuel with low cetane number is used under the operation range where the engine has the low load and the low rotation speed, the self-ignition conditions can be satisfied in either of the cases in which the throttle valve 36 is throttled or not throttled.

Here, the values from the equations and mathematical statements are obtained for the condition in which only the one of the exhaust valves 22 is opened during the intake stroke. Therefore, when, for example, both the two exhaust valves 22 are opened in the intake stroke, the lift amount and valve opening period per valve are required to be less and shorter in order to maintain the above described value of the valve opening area ratio $S_E/S_I$. However, reducing the lift amount and shortening the opening period of the exhaust valve 22 makes the movement of the exhaust valve 22 to be smaller and may cause the introduction amount of the internal EGR gas to vary. That is, sufficiently increasing the lift amount and extending the opening period of the exhaust valve 22 is desired to surely secure the required amount of the internal EGR gas. Therefore, opening only the one of the exhaust valves 22 during the intake stroke is effective in improving the ignitability of the fuel.

The contour chart in FIG. 4 utilizes the valve opening area ratio $S_E/S_I$ as a parameter to serve as one of the lift properties of the exhaust valve relating to properties of the internal EGR gas amount. Alternatively, the opening period ($\theta_{EC}-\theta_{EO}$) of the exhaust valve 22 in the intake stroke may be utilized as the parameter to serve as one of the lift properties of the exhaust valve relating to the properties of the internal EGR gas amount.

Figure 6:
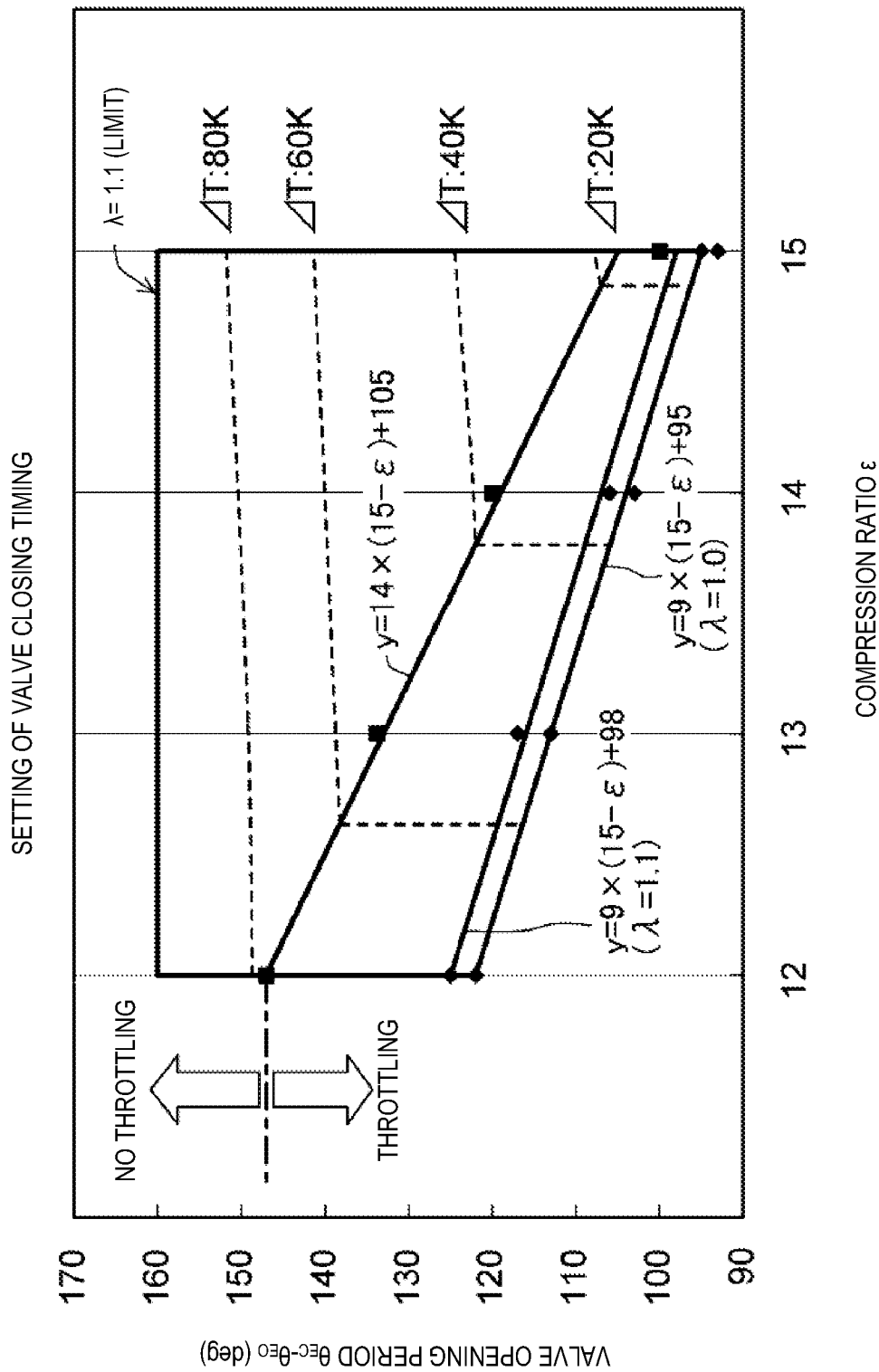
FIG. 6 is a contour chart relating to a temperature increase amount at the end of the compression stroke according to a relation between the geometric compression ratio $\epsilon$ of the engine and an opening period ($\theta_{EC}-\theta_{EO}$) of the exhaust valve under the condition in which the timing for closing the exhaust valve is set to the predetermined timing.

FIG. 6 is a contour chart indicating temperature increase amounts ($\Delta T$) at the end of the compression stroke determined based on a relation between the geometric compression ratio $\epsilon$ of the engine 1 (horizontal axis) and the opening period ($\theta_{EC}-\theta_{EO}$) of the exhaust valve 22 (vertical axis). Here, as described above, the opening period ($\theta_{EC}-\theta_{EO}$) (unit: deg) of the exhaust valve 22 may be set as a range of the crank angle corresponding to the bulge area in the lift curve of the exhaust valve 22. Specifically, the points where the exhaust valve 22 is lifted by 0.5 mm may be set as the opening timing $\theta_{EO}$ and the closing timing $\theta_{EC}$ of the exhaust valve 22 (see FIG. 5).

As shown in FIG. 6, when the throttle valve 36 is throttled within the operation range of the low engine load and rotation speed and the excess air ratio $\lambda=1.0$, the lift properties of the exhaust valve 22 are set to satisfy the following mathematical statement for the opening period ($\theta_{EC}-\theta_{EO}$) of the exhaust valve 22:

$$9\times(15-\epsilon)+95 \leq (\theta_{EC}-\theta_{EO}) \leq 160[\text{deg}] \qquad \text{Statement (5).}$$

In FIG. 6, the minimum value of the opening period ($\theta_{EC}-\theta_{EO}$) is indicated in a manner where minimum values calculated for the respective compression ratios (see square shaped dots) are approximated by a first order equation (a straight line). Similarly, when the excess air ratio $\lambda=1.1$, the lift properties of the exhaust valve 22 are set to satisfy the following mathematical statement for the opening period ($\theta_{EC}-\theta_{EO}$) of the exhaust valve 22:

$$9\times(15-\epsilon)+98 \leq (\theta_{EC}-\theta_{EO}) \leq 160[\text{deg}] \qquad \text{Statement (5-2).}$$

On the other hand, as shown in FIG. 6, when the throttle valve 36 is not throttled within the operation range of the low engine load and rotation speed, the lift properties of the exhaust valve 22 are set to satisfy the following mathematical statement for the opening period ($\theta_{EC}-\theta_{EO}$) of the exhaust valve 22:

$$14\times(15-\epsilon)+105 \leq (\theta_{EC}-\theta_{EO}) \leq 160[\text{deg}] \qquad \text{Statement (6).}$$

Figure 8:
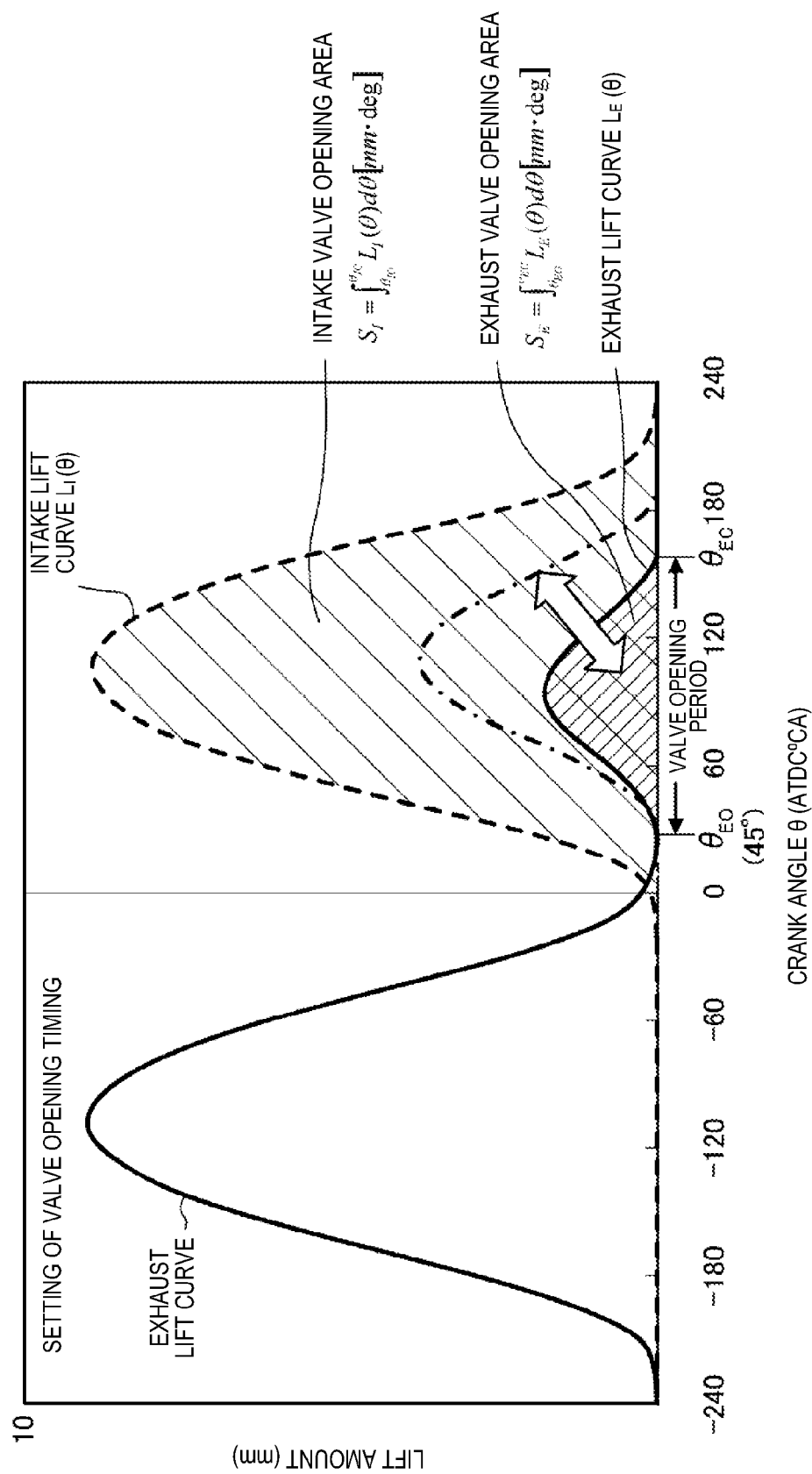
FIG. 8 is a chart showing an example of lift curves of the intake and exhaust valves under the condition in which the timing for opening the exhaust valve is set to the predetermined timing.

As described above, FIGS. 4 and 6 are the contour charts under the condition in which the closing timing of the exhaust valve 22 during the intake stroke is set in the later stage of the intake stroke. Alternately, the opening timing of the exhaust valve 22 during the intake stroke may be set in the earlier stage of the intake stroke as shown in, for example, FIG. 8. Here, because the exhaust valve 22 is opened after a predetermined shock absorbing period has elapsed after the exhaust valve 22 has closed during the exhaust stroke, the opening timing of the exhaust valve 22 is set to the point after a predetermined time has elapsed from the opening timing of the intake valves 21. In other words, the opening timing of the exhaust valve 22 is set to the point where a predetermined time has elapsed from the top dead center in the intake stroke. Specifically, the opening timing of the exhaust valve 22 is set at 45° C.A after the top dead center in the intake stroke. Hereinafter, the set timing may be referred to as "the condition in which the timing for opening the exhaust valve 22 is set". Because the exhaust valve 22 is opened in the earlier stage of the intake stroke under the condition in which the timing for opening the exhaust valve 22 is set, the new air is difficult to be introduced into the cylinders in the earlier stage of the intake stroke.

Figure 7:
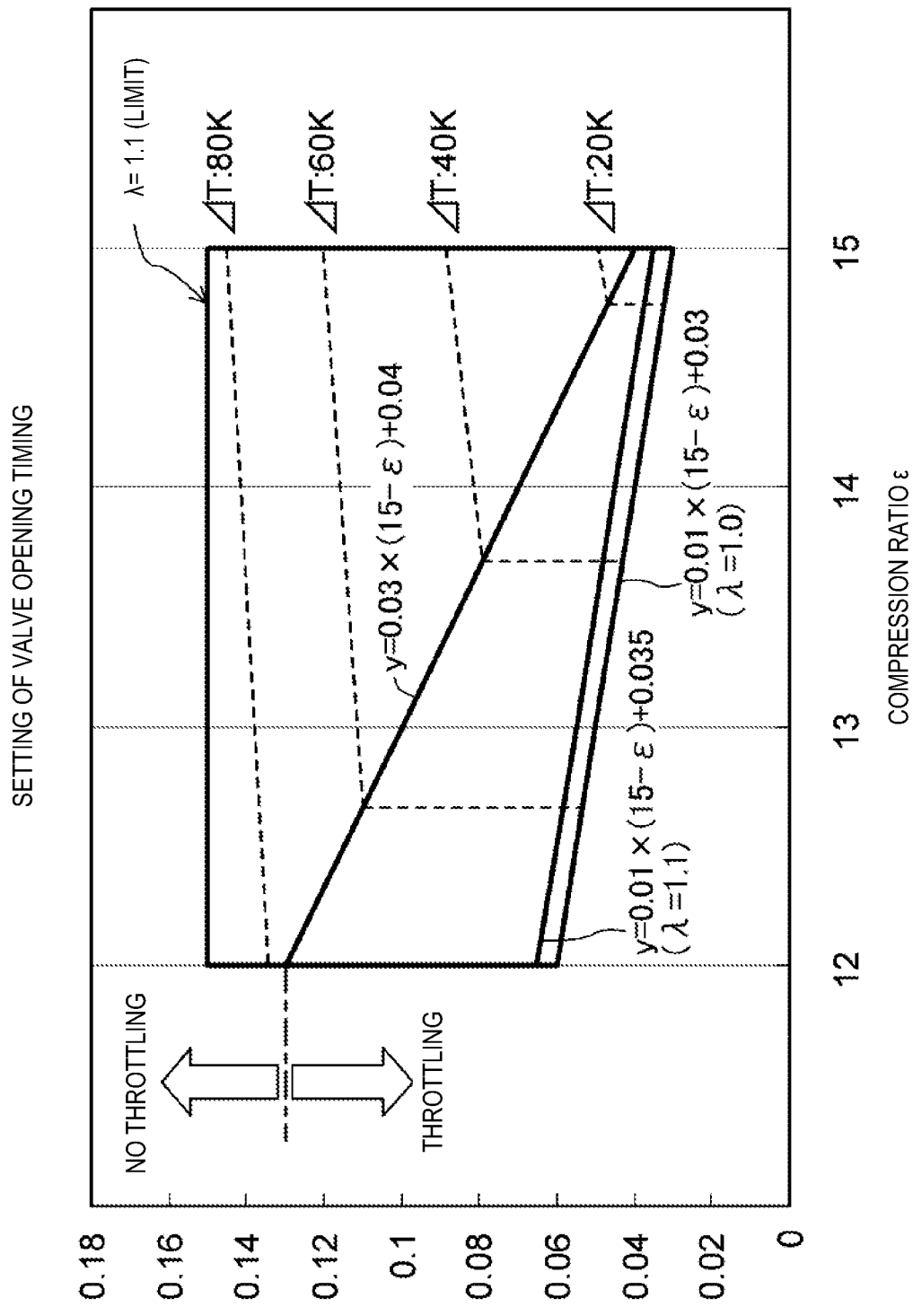
FIG. 7 is a contour chart relating to a temperature increase amount at the end of the compression stroke according to the relation between the geometric compression ratio $\epsilon$ of the engine and the opening area ratio $S_E/S_I$ of the intake and exhaust valves under a condition in which a timing for opening the exhaust valve is set to a predetermined timing.

FIG. 7 is a contour chart (isogram chart) relating to a temperature increase amount ($\Delta T$) at the end of the compression stroke according to the relation between the geometric compression ratio $\epsilon$ of the engine and the valve opening area ratio $S_E/S_I$ under the condition in which a timing for opening the exhaust valve is set. That is, the contour chart in FIG. 7 is obtained by performing an estimation-calculation for the temperature at the end of the compression stroke for every geometric compression ratio of the engine 1 under the predetermined operating condition of the engine 1 while changing the exhaust valve opening area $S_E$ by changing the lift curve, where its contour is kept approximately the same, under the condition in which the timing for opening the exhaust valve 22 during the intake stroke is not changed (45° C.A after the top dead center in the intake stroke) as indicated by the white arrow in FIG. 8. When the throttle valve 36 is throttled so that the excess air ratio $\lambda=1.0$, the valve opening area ratio $S_E/S_I$ is set to satisfy the following mathematical statement:

$$0.01\times(15-\epsilon)+0.03 \leq S_E/S_I \leq 0.15 \qquad \text{Statement (3).}$$

The minimum value is shifted to be higher in the Statement (3) compared to the Statement (1). As described above, because the new air becomes harder to be introduced into the cylinders 11a in the earlier stage of the intake stroke, the throttle valve 36 needs to be opened comparatively more to maintain the excess air ratio $\lambda=1.0$. Thus, the negative intake air pressure is correspondingly reduced, and, thereby, the amount of the external EGR gas passed through the exhaust gas re-circulation passage 51 is reduced. Therefore, the valve opening area ratio $S_E/S_I$ is required to be higher to obtain the larger exhaust valve opening area $S_E$ so that the amount of the internal EGR gas increases.

The maximum value of the valve opening area ratio $S_E/S_I$ is shifted to be lower in the Statement (3) compared to the Statement (1) because the amount of the internal EGR gas needs to be restricted to secure the amount of the new air for maintaining the excess air ratio $\lambda=1.1$ due to the new air becoming harder to be introduced in the earlier stage of the intake stroke.

Further, as shown in FIG. 7, when the excess air ratio $\lambda=1.1$, the exhaust valve opening area $S_E$ is set to satisfy the following statement:

$$0.01\times(15-\epsilon)+0.035 \leq S_E/S_I \leq 0.15 \qquad \text{Statement (3-2).}$$

Further, as shown in FIG. 7, under the condition in which the throttle valve 36 is not throttled in the operation range with comparatively low load and low rotation speed side, the exhaust valve opening area $S_E$ is set to satisfy the following statement:

$$0.03\times(15-\epsilon)+0.04 \leq S_E/S_I \leq 0.15 \qquad \text{Statement (4).}$$

Figure 9:
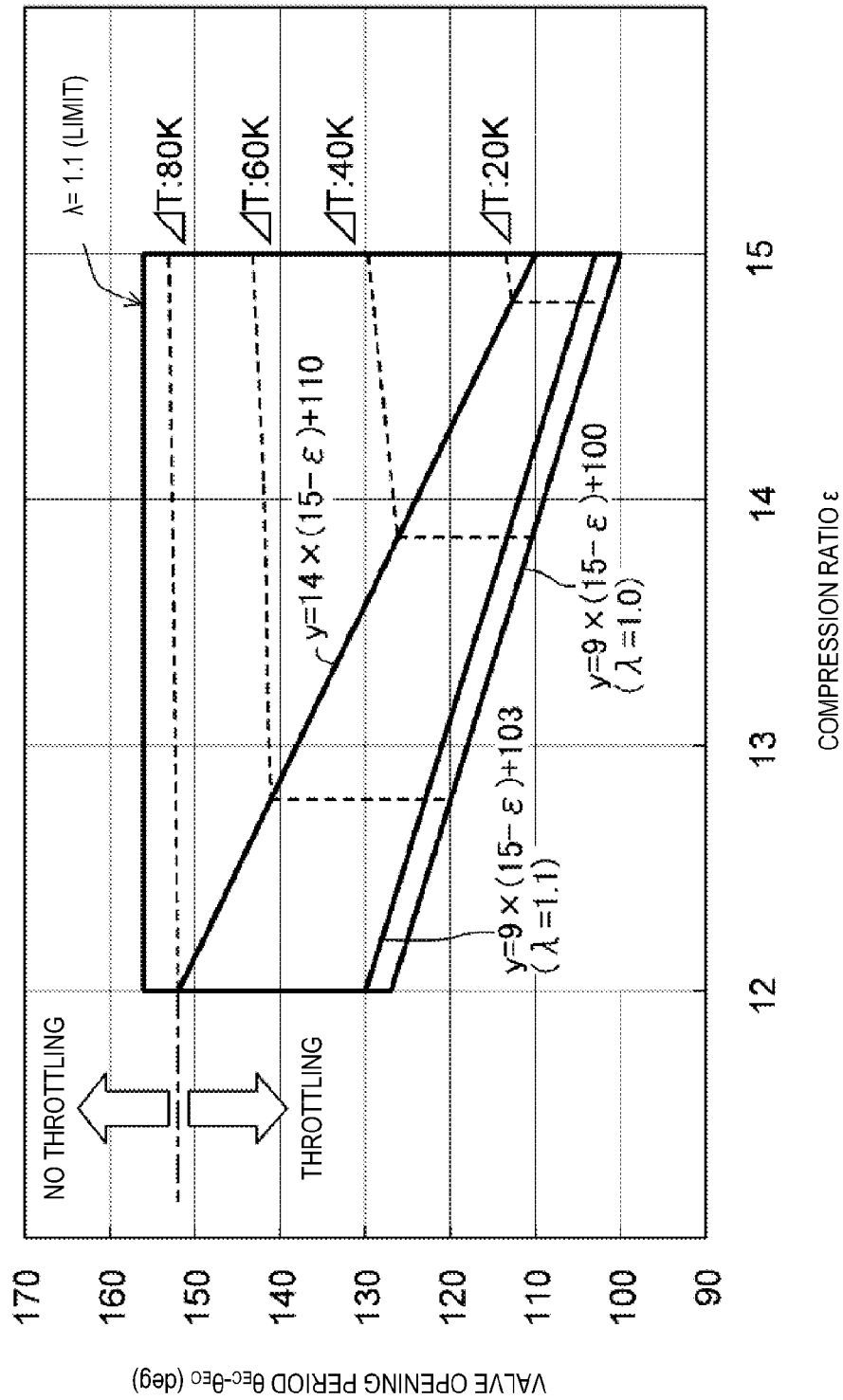
FIG. 9 is a contour chart relating to a temperature increase amount at the end of the compression stroke according to the relation between the geometric compression ratio $\epsilon$ of the engine and the opening period ($\theta_{EC}-\theta_{EO}$) of the exhaust valve under the condition in which the timing for opening the exhaust valve is set to the predetermined timing.

When the opening period ($\theta_{EC}-\theta_{EO}$) of the exhaust valve 22 serves as the parameter as described above, the minimum and maximum values of the valve opening period ($\theta_{EC}-\theta_{EO}$) are set as shown in FIG. 9. Specifically, under the condition in which the throttle valve 36 is throttled, the follow statement:

$$9\times(15-\epsilon)+100 \leq (\theta_{EC}-\theta_{EO}) \leq 155[\text{deg}] \qquad \text{Statement (7)}$$

is established when the excess air ratio $\lambda=1.0$, and the following statement:

$$9\times(15-\epsilon)+103 \leq (\theta_{EC}-\theta_{EO}) \leq 155[\text{deg}] \qquad \text{Statement (7-2)}$$

is established when the excess air ratio $\lambda=1.1$. Further, under the condition in which the throttle valve 36 is not throttled, the following statement:

$$9\times(15-\epsilon)+110 \leq (\theta_{EC}-\theta_{EO}) \leq 155[\text{deg}] \qquad \text{Statement (8)}$$

is established.

Thus, the predetermined lift properties are set for the exhaust valve 22 in the intake stroke. Thereby, in the diesel engine with comparatively low compression ratio, such as 12:1 to 15:1, even if the fuel with low cetane number of which the ignitability is low is supplied, the sufficient ignitability can be secured regardless of the operation range of the engine 1. Therefore, a slow combustion due to the reduction of the compression ratio of the diesel engine 1 can be achieved, the NOx discharge amount can be reduced or prevented, the soot is suppressed and the exhaust emission performance can be improved. As a result, the NOx catalyst may be unnecessary. Further, the reduction of the compression ratio of the engine 1 reduces a mechanical resistance loss and improves a thermal efficiency, and further improves fuel consumption. Therefore, specifying the lift properties of the exhaust valve 22 is effective in realizing the diesel engine 1 with improved exhaust emission performance and fuel consumption performance.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A diesel engine for a vehicle, comprising:
an engine body to be mounted in the vehicle and supplied with fuel containing diesel fuel as its main component, a geometric compression ratio $\epsilon$ being set within a range of 12:1 to 15:1, wherein the engine body includes:
an intake valve for opening and closing an intake port communicating an intake passage with a cylinder;
an exhaust valve for opening and closing an exhaust port communicating an exhaust passage with the cylinder; and
an exhaust gas re-circulation passage communicating the intake passage with the exhaust passage and for partially re-circulating exhaust gas to the intake passage;
wherein, when the engine body is at least in an operating state with comparatively low load and low rotation speed, the exhaust valve is opened during an intake stroke so that the exhaust gas is partially introduced into the cylinder and the intake passage is choked;

wherein the exhaust valve that is opened during the intake stroke is closed before the intake valve is closed in a later stage of the intake stroke; and wherein an opening area $S_E$ [mm·deg] of the exhaust valve, that is defined by a lift curve of the exhaust valve in the intake stroke, is set so that a ratio $S_E/S_I$ of the opening area $S_E$ of the exhaust valve to an opening area $S_I$ [mm·deg] of the intake valve, that is defined by a lift curve of the intake valve, meets a relation of:

$$0.01\times(15-\epsilon)+0.02 \leq S_E/S_I \leq 0.17,$$

with respect to the geometric compression ratio $\epsilon$ of the engine body.

2. The diesel engine of claim 1, wherein the engine body has two intake valves and two exhaust valves per cylinder, and only one of the exhaust valves is opened while both of the two intake valves are opened, during the intake stroke.

3. The diesel engine of claim 2, wherein each of the intake and exhaust valves is a poppet valve that lifts according to a predetermined lift curve; and wherein the lift curve of the intake valve and the lift curve of the exhaust valve have shapes similar to each other.

4. The diesel engine of claim 1, wherein each of the intake and exhaust valves is a poppet valve that lifts according to a predetermined lift curve; and wherein the lift curve of the intake valve and the lift curve of the exhaust valve have shapes similar to each other.

5. A diesel engine for a vehicle, comprising:

an engine body to be mounted in the vehicle and supplied with fuel containing diesel fuel as its main component, a geometric compression ratio $\epsilon$ being set within a range of 12:1 to 15:1, wherein the engine body includes:

an intake valve for opening and closing an intake port communicating an intake passage with a cylinder;

an exhaust valve for opening and closing an exhaust port communicating an exhaust passage with the cylinder; and an exhaust gas re-circulation passage communicating the intake passage with the exhaust passage and for partially re-circulating exhaust gas to the intake passage;

wherein, when the engine body is at least in an operating state with comparatively low load and low rotation speed, the exhaust valve is opened during an intake stroke so that the exhaust gas is partially introduced into the cylinder and the intake passage is not choked;

wherein the exhaust valve that is opened during the intake stroke is closed before the intake valve is closed in a later stage of the intake stroke; and wherein an opening area $S_E$ [mm·deg] of the exhaust valve, that is defined by a lift curve of the exhaust valve in the intake stroke, is set so that a ratio $S_E/S_I$ of the opening area $S_E$ of the exhaust valve to an opening area $S_I$ [mm·deg] of the intake valve, that is defined by a lift curve of the intake valve, meets a relation of:

$$0.03\times(15-\epsilon)+0.03 \leq S_E/S_I \leq 0.17,$$

with respect to the geometric compression ratio $\epsilon$ of the engine body.

6. The diesel engine of claim 5, wherein each of the intake and exhaust valves is a poppet valve that lifts according to a predetermined lift curve; and wherein the lift curve of the intake valve and the lift curve of the exhaust valve have shapes similar to each other.

7. A diesel engine for a vehicle, comprising:

an engine body to be mounted in the vehicle and supplied with fuel containing diesel fuel as its main component, a geometric compression ratio $\epsilon$ being set within a range of 12:1 to 15:1, wherein the engine body includes:

an intake valve for opening and closing an intake port communicating an intake passage with a cylinder;

an exhaust valve for opening and closing an exhaust port communicating an exhaust passage with the cylinder; and an exhaust gas re-circulation passage communicating the intake passage with the exhaust passage and for partially re-circulating exhaust gas to the intake passage;

wherein, when the engine body is at least in an operating state with comparatively low load and low rotation speed, the exhaust valve is opened during an intake stroke so that the exhaust gas is partially introduced into the cylinder and the intake passage is choked;

wherein the exhaust valve that is opened during the intake stroke is opened at a predetermined time after the intake valve is opened; and wherein an opening area $S_E$ [mm·deg] of the exhaust valve, that is defined by a lift curve of the exhaust valve in the intake stroke, is set so that a ratio $S_E/S_I$ of the opening area $S_E$ of the exhaust valve to an opening area $S_I$ [mm·deg] of the intake valve, that is defined by a lift curve of the intake valve, meets a relation of:

$$0.01\times(15-\epsilon)+0.03 \leq S_E/S_I \leq 0.15,$$

with respect to the geometric compression ratio $\epsilon$ of the engine body.

8. The diesel engine of claim 7, wherein each of the intake and exhaust valves is a poppet valve that lifts according to a predetermined lift curve; and wherein the lift curve of the intake valve and the lift curve of the exhaust valve have shapes similar to each other.

9. A diesel engine for a vehicle, comprising:

an engine body to be mounted in the vehicle and supplied with fuel containing diesel fuel as its main component, a geometric compression ratio $\epsilon$ being set within a range of 12:1 to 15:1, wherein the engine body includes:

an intake valve for opening and closing an intake port communicating an intake passage with a cylinder;

an exhaust valve for opening and closing an exhaust port communicating an exhaust passage with the cylinder; and an exhaust gas re-circulation passage communicating the intake passage with the exhaust passage and for partially re-circulating exhaust gas to the intake passage;

wherein, when the engine body is at least in an operating state with comparatively low load and low rotation speed, the exhaust valve is opened during an intake stroke so that the exhaust gas is partially introduced into the cylinder and the intake passage is not choked;

wherein the exhaust valve that is opened during the intake stroke is opened at a predetermined time after the intake valve is opened; and wherein an opening area $S_E$ [mm·deg] of the exhaust valve, that is defined by a lift curve of the exhaust valve in the intake stroke, is set so that a ratio $S_E/S_I$ of the opening area $S_E$ of the exhaust valve to an opening area $S_I$ [mm·deg] of the intake valve, that is defined by a lift curve of the intake valve, meets a relation of:

$$0.03\times(15-\epsilon)+0.04 \leq S_E/S_I \leq 0.15,$$

with respect to the geometric compression ratio $\epsilon$ of the engine body.

10. The diesel engine of claim 9, wherein each of the intake and exhaust valves is a poppet valve that lifts according to a predetermined lift curve; and
wherein the lift curve of the intake valve and the lift curve of the exhaust valve have shapes similar to each other.

11. A diesel engine for a vehicle, comprising:
an engine body to be mounted in the vehicle and supplied with fuel containing diesel fuel as its main component, a geometric compression ratio $\epsilon$ being set within a range of 12:1 to 15:1, wherein the engine body including:
an intake valve for opening and closing an intake port communicating an intake passage with a cylinder;
an exhaust valve for opening and closing an exhaust port communicating an exhaust passage with the cylinder; and
an exhaust gas re-circulation passage communicating the intake passage with the exhaust passage and for partially re-circulating exhaust gas to the intake passage;
wherein, when the engine body is at least in an operating state with comparatively low load and low rotation speed, the exhaust valve is opened during an intake stroke so that the exhaust gas is partially introduced into the cylinder and the intake passage is choked;
wherein the exhaust valve that is opened during the intake stroke is closed before the intake valve is closed in a later stage of the intake stroke; and
wherein an opening period ($\theta_{EC} - \theta_{EO}$) [deg] of the exhaust valve in the intake stroke meets a relation of:

$$9\times(15-\epsilon)+95 \leq (\theta_{EC}-\theta_{EO}) \leq 160 [\text{deg}],$$

with respect to the geometric compression ratio $\epsilon$ of the engine body, the points at which the exhaust valve is lifted by 0.5 mm being defined as an opening timing $\theta_{EO}$ and a closing timing $\theta_{EC}$.

12. A diesel engine for a vehicle, comprising:
an engine body to be mounted in the vehicle and supplied with fuel containing diesel fuel as its main component, a geometric compression ratio $\epsilon$ being set within a range of 12:1 to 15:1, wherein the engine body including:
an intake valve for opening and closing an intake port communicating an intake passage with a cylinder;
an exhaust valve for opening and closing an exhaust port communicating an exhaust passage with the cylinder; and
an exhaust gas re-circulation passage communicating the intake passage with the exhaust passage and for partially re-circulating exhaust gas to the intake passage;
wherein, when the engine body is at least in an operating state with comparatively low load and low rotation speed, the exhaust valve is opened during an intake stroke so that the exhaust gas is partially introduced into the cylinder and the intake passage is not choked;
wherein the exhaust valve that is opened during the intake stroke is closed before the intake valve is closed in a later stage of the intake stroke; and
wherein an opening period ($\theta_{EC} - \theta_{EO}$) [deg] of the exhaust valve in the intake stroke meets a relation of:

$$14\times(15-\epsilon)+105 \leq (\theta_{EC}-\theta_{EO}) \leq 160 [\text{deg}],$$

with respect to the geometric compression ratio $\epsilon$ of the engine body, the points at which the exhaust valve is lifted by 0.5 mm being defined as an opening timing $\theta_{EO}$ and a closing timing $\theta_E$.

13. A diesel engine for a vehicle, comprising:
an engine body to be mounted in the vehicle and supplied with fuel containing diesel fuel as its main component, a geometric compression ratio $\epsilon$ being set within a range of 12:1 to 15:1, wherein the engine body including:
an intake valve for opening and closing an intake port communicating an intake passage with a cylinder;
an exhaust valve for opening and closing an exhaust port communicating an exhaust passage with the cylinder; and
an exhaust gas re-circulation passage communicating the intake passage with the exhaust passage and for partially re-circulating exhaust gas to the intake passage;
wherein, when the engine body is at least in an operating state with comparatively low load and low rotation speed, the exhaust valve is opened during an intake stroke so that the exhaust gas is partially introduced into the cylinder and the intake passage is choked;
wherein the exhaust valve that is opened during the intake stroke is opened at a predetermined time after the intake valve is opened; and
wherein an opening period ($\theta_{EC} - \theta_{EO}$) [deg] of the exhaust valve in the intake stroke meets a relation of:

$$9\times(15-\epsilon)+100 \leq (\theta_{EC}-\theta_{EO}) \leq 155 [\text{deg}],$$

with respect to the geometric compression ratio $\epsilon$ of the engine body, the points at which the exhaust valve is lifted by 0.5 mm being defined as an opening timing $\theta_{EO}$ and a closing timing $\theta_E$.

14. A diesel engine for a vehicle, comprising:
an engine body to be mounted in the vehicle and supplied with fuel containing diesel fuel as its main component, a geometric compression ratio $\epsilon$ being set within a range of 12:1 to 15:1, wherein the engine body including:
an intake valve for opening and closing an intake port communicating an intake passage with a cylinder;
an exhaust valve for opening and closing an exhaust port communicating an exhaust passage with the cylinder; and
an exhaust gas re-circulation passage communicating the intake passage with the exhaust passage and for partially re-circulating exhaust gas to the intake passage;
wherein, when the engine body is at least in an operating state with comparatively low load and low rotation speed, the exhaust valve is opened during an intake stroke so that the exhaust gas is partially introduced into the cylinder and the intake passage is not choked;
wherein the exhaust valve that is opened during the intake stroke is opened at a predetermined time after the intake valve is opened; and
wherein an opening period ($\theta_{EC} - \theta_{EO}$) [deg] of the exhaust valve in the intake stroke meets a relation of:

$$9\times(15-\epsilon)+110 \leq (\theta_{EC}-\theta_{EO}) \leq 155 [\text{deg}],$$

with respect to the geometric compression ratio $\epsilon$ of the engine body, the points at which the exhaust valve is lifted by 0.5 mm being defined as an opening timing $\theta_{EO}$ and a closing timing $\theta_E$.

* * * * *